United States Patent [19]

Inoue

[11] Patent Number: 5,642,500
[45] Date of Patent: Jun. 24, 1997

[54] METHOD AND APPARATUS FOR CONTROLLING INSTRUCTION IN PIPELINE PROCESSOR

[75] Inventor: Aiichiro Inoue, Kawasaki, Japan

[73] Assignee: Fujitsu Limited, Kawasaki, Japan

[21] Appl. No.: 303,835

[22] Filed: Sep. 9, 1994

[30]  Foreign Application Priority Data

Nov. 26, 1993  [JP]  Japan ................... 5-296940

[51] Int. Cl.⁶ .................................................. G06F 9/38
[52] U.S. Cl. ........................................ 395/580; 395/586
[58] Field of Search ............................ 395/375, 775, 395/580–587

[56]  References Cited

U.S. PATENT DOCUMENTS

| | | | |
|---|---|---|---|
| 4,200,927 | 4/1980 | Hughes et al. | 395/375 |
| 4,679,141 | 7/1987 | Pomerene et al. | 395/375 |
| 4,763,245 | 8/1988 | Emma et al. | 395/375 |
| 4,881,170 | 11/1989 | Morisada | 395/375 |
| 5,228,131 | 7/1993 | Ueda et al. | 395/375 |
| 5,276,882 | 1/1994 | Emma et al. | 395/700 |
| 5,283,873 | 2/1994 | Gteely, Jr. et al. | 395/375 |
| 5,287,467 | 2/1994 | Blaner et al. | 395/375 |
| 5,345,571 | 9/1994 | Morisada | 395/375 |
| 5,367,703 | 11/1994 | Levitan | 395/375 |
| 5,394,530 | 2/1995 | Kitta | 395/375 |

FOREIGN PATENT DOCUMENTS

| | | |
|---|---|---|
| 0 109 655 | 5/1984 | European Pat. Off. . |
| 0 355 069 | 2/1990 | European Pat. Off. . |
| 0 402 524 | 12/1990 | European Pat. Off. . |
| 93 01545 | 1/1993 | WIPO . |

*Primary Examiner*—Ayaz R. Sheikh
*Attorney, Agent, or Firm*—Staas & Halsey

[57]  ABSTRACT

A pipeline processor for processing instruction fetch prior to execution of the instruction based on the content of branch history for storing history of the result of execution of branch instructions includes an address generating section, branch history retrieving section, prefetch address holding section and instruction fetch section. The branch history retrieving section determines whether each of addresses sequentially generated from the address generating section hits the branch history or not. When an instruction stored in the address hits the branch history, the branch history retrieving section supplies the content of the branch history to the prefetch address holding section. When the branch history retrieving section is hit, the prefetch address holding section holds the branching-destination address of the branch instruction until the instruction is fetched by the instruction fetch section. If an instruction fetched in a preceding cycle hits the branch history, the instruction fetch section fetches an instruction of an address held in the prefetch address holding section, and if the instruction fetched in a preceding cycle does not hit the branch history, the instruction fetch section fetches an instruction of an address generated from the address generating section.

14 Claims, 12 Drawing Sheets

FIG.8

| ADDRESS | INSTRUCTION | |
|---|---|---|
| $1000_{HEX}$ | INSTRUCTION 1a | (BRANCH INSTRUCTION TO ADDRESS OF $2000_{HEX}$) |
| $1004_{HEX}$ | INSTRUCTION 2a | |
| $1008_{HEX}$ | INSTRUCTION 3a | |
| ⋮ | ⋮ | |
| $2000_{HEX}$ | INSTRUCTION 1b | |
| $2004_{HEX}$ | INSTRUCTION 2b | |
| $2008_{HEX}$ | INSTRUCTION 3b | |
| $200A_{HEX}$ | INSTRUCTION 4b | (BRANCH INSTRUCTION TO ADDRESS OF $3000_{HEX}$) |
| $200C_{HEX}$ | INSTRUCTION 5b | |
| $2010_{HEX}$ | INSTRUCTION 6b | |
| ⋮ | ⋮ | |
| $3000_{HEX}$ | INSTRUCTION 1c | |
| $3004_{HEX}$ | INSTRUCTION 2c | |
| $3008_{HEX}$ | INSTRUCTION 3c | |
| ⋮ | ⋮ | |

METHOD AND APPARATUS FOR CONTROLLING INSTRUCTION IN PIPELINE PROCESSOR

BACKGROUND OF THE INVENTION

1. Field of the Invention

This invention relates to a pipeline processor which is a data processor for executing a sequential instruction stream by use of a pipeline processing system, and more particularly to an instruction controlling method and apparatus in a pipeline processor for independently processing instruction fetch and instruction execution in a pipeline fashion, previously predicting a branching destination (target) by a branch instruction based on branch history which is history information of the result of past execution of branch instruction, and fetching an instruction string of the branching destination before completion of the branch instruction execution.

2. Description of the Related Art

A pipeline processor is a data processor utilizing a pipeline processing system for executing a sequential instruction stream. In the pipeline processor, if an execution stage becomes available when one instruction is executed in the instruction execution process, a next instruction is applied to the available stage and execution of the next instruction is started even if execution of the preceding instruction is not completed. Thus, in the pipeline processor, an attempt is made to enhance the performance by sequentially applying instructions and starting execution of the instructions if an execution stage becomes available without waiting for completion of the individual instruction execution in the process of executing sequential instructions.

However, the result of execution of the preceding instruction often gives an influence on execution of the succeeding instruction, and in this case, it is necessary to wait for execution of the preceding instruction before starting execution of the succeeding instruction, thus causing disorder in the pipeline. The disorder of the pipeline may cause the performance of the pipeline to be lowered.

Particularly, in the branch instruction, whether the branch is taken or not and the address of an instruction of a branching destination cannot be determined until the branch instruction execution is completed. That is, when a fetched instruction is a branch instruction, whether the branch is taken or not cannot be determined before the branch instruction is executed, and therefore, the address of an instruction of a branching destination based on the result of execution of the branch cannot be determined prior to execution of the branch instruction. The branch instruction naturally causes disorder in the pipeline. The frequency of occurrence of the branch instruction is high and most likely causes degradation of the performance of the pipeline processor.

In order to alleviate the degree of disorder of the pipeline due to the branch instruction, for example, it is considered to enhance the efficiency of the pipeline process by storing the relation between control information as to whether the branch is taken or not, the instruction address of the branch instruction, and the "branching-destination" address which is an instruction address of the branching destination into a memory as history information called branch history, for example, predicting the result of execution of the branch instruction based on past history information registered in the branch history, prefetching the instruction of the branching destination, and applying the fetched instruction to an instruction execution stage following the branch instruction. That is, when the above mechanism is utilized, whether the branch is taken or not and a corresponding branching-destination address are previously predicted based on the history of the result of past execution registered in the branch history prior to execution of the branch instruction or completion thereof and instruction fetch is effected by use of the predicted branching-destination address according to the predicted result of the branch to supply the fetched instruction to the instruction execution stage following the branch instruction.

A case wherein the branch is taken, a branch instruction is contained in a branching-destination instruction string, and a branch is taken in the branch instruction may be sometimes provided as the result of execution of the branch instruction. Such a case occurs mainly in a process in which different instruction strings are sequentially executed by jumps by branch instructions, but it occurs not only in the above process, but also in a case wherein a jump of several instructions is made by a conditional branch to selectively effect a process and a case wherein a jump is made to the head instruction of the instruction string in which the branch instruction is present to form a loop, for example, and such cases are naturally expected to occur in general processes.

In the above case, it is easily supposed that the instruction fetch of a branching destination of a branch instruction is effected by use of a branching-destination address obtained from the branch history prior to execution of the branch instruction itself and a branching-destination address of a next branch instruction can be derived from the branch history by the instruction fetch.

However, in order to fetch the instruction string of the branching destination by use of the branching-destination address obtained from the branch history prior to execution of the branch instruction, a mechanism for holding the fetched instruction string, for example, instruction buffer is necessary. Such an instruction buffer has a limitation in its capacity, and generally cannot hold a large number of instruction strings. Therefore, fetch of the instruction strings of the branching destination based on information obtained from the branch history cannot be effected limitlessly.

Further, when taking the efficiency of usage of the instruction buffer into consideration, it is desirable to effect the fetch of the instruction strings of the branching destination based on the branch history only when the possibility that the instruction string to be prefetched will be actually used is determined to be high as the result of execution of the branch. When the possibility that the instruction string to be prefetched will be actually used is determined to be high as the result of execution of the branch as described before, the effect of the branch history is significantly lowered if fetch of the instruction string of a branching destination of a next branch instruction cannot be effected based on information of the branch history.

SUMMARY OF THE INVENTION

An object of this invention is to provide an instruction controlling method and apparatus which are used in a pipeline processor for independently processing instruction fetch and execution of instructions in a pipeline fashion and effecting prefetch of branching-destination instructions using a branch history and which can prevent degradation of the performance due to branch instructions without causing a lowering of the processing efficiency due to the branch instructions and an increase in the amount of hardware such as an instruction buffer by effectively using the branch history.

In accordance with a first aspect of the present invention, an instruction controlling system is provided in a pipeline processor for storing the history of information on the result of past execution of branch instructions, addresses in which the branch instructions are stored, and branching-destination addresses of the branch instructions when the branch is taken as branch history into a branch history storing section and processing the instruction fetch in a pipeline fashion prior to the instruction execution based on the content of the branch history and the system includes an address generating section, branch history retrieving section, prefetch address holding section and instruction fetch section.

The address generating section generates addresses starting from a predetermined address and incremented by a preset amount at a time. The addresses correspond to an instruction string including a sequence of instructions. When a branch instruction is present in the instruction string corresponding to the addresses generated from the address generating section and the branch of the branch instruction is taken, then the address generating section generates addresses starting from the branching-destination address and incremented by a preset amount at a time. For achieving this operation, when a prefetch address of the branching destination obtained from the branch history is fetched by the instruction fetch section, the address generating section sequentially generates addresses starting from an address which is determined by incrementing the prefetch address by a preset amount, and when a branching-destination address other than the prefetch address is obtained by execution of the branch instruction, the address generating section sequentially generates addresses starting from the above address. When the branch by the branch instruction is effected, an address of the branching origin is held in the address generating section in order to make it possible to return the process from the instruction string of the branching destination to the instruction string of the branching origin, if necessary.

The branch history retrieving section refers to the branch history for addresses sequentially generated from the address generating section so as to determine whether an instruction stored in the address is a branch instruction registered in the branch history or not (for example, whether the address is registered in the branch history or not). When the instruction stored in the address is a branch instruction registered in the branch history, the branch history retrieving section fetches branch-possibility information indicating the possibility of the branch derived from the history of the branching result of the branch instruction and a branching-destination address corresponding to the branch-possibility information from the branch history and supplies the same to the prefetch address holding section. In contrast, when the instruction stored in the address is not a branch instruction registered in the branch history (that is, when it is not a branch instruction, or when it is a branch instruction which is not registered in the branch history since it is not executed in the past), the branch history retrieving section does not effect any process until a next address is given.

The prefetch address holding section holds a branching-destination address of the branch instruction to prefetch an instruction of the branching destination when the branch-possibility information is obtained in the branch history retrieving section. The prefetch address holding section holds the branching-destination address until the instruction stored in the branching-destination address is fetched.

The instruction fetch section fetches an instruction stored in the address generated by the address generating section or the address held in the prefetch address holding section. That is, the instruction fetch section fetches an instruction stored in the address held in the prefetch address holding section when the instruction fetched in the preceding cycle has obtained the branch-possibility information and branching-destination address provided by the branch history retrieving section, and fetches an instruction of an address generated from the address generating section when the instruction fetched in the preceding cycle has not obtained the branch-possibility information and branching-destination address provided by the branch history retrieving section. At the time of instruction fetch based on an address held in the prefetch address holding section, the instruction fetch section defers the instruction fetch until the instruction buffer becomes available if the instruction buffer has no available capacity, and then effects the instruction fetch when it becomes possible to effect the instruction fetch.

That is, in the above instruction control system, when the pipeline control is effected to effect the instruction fetch prior to the instruction execution by using the branch history, control for the instruction fetch is effected by the following procedure.

First, addresses starting from a preset address and incremented by a preset amount at a time are generated from the address generating section. If a branch instruction is present in the instruction string corresponding to the addresses generated from the address generating section and the branch of the branch instruction is taken, then addresses starting from the branching-destination address and incremented by a preset amount at a time are generated from the address generating section. That is, in the address generating section, when a prefetch address of the branching destination obtained from the branch history is fetched by the instruction fetching section, addresses are sequentially generated starting from an address determined by incrementing the prefetch address by a preset amount, and when a branching-destination address other than the prefetch address is obtained by execution of the branch instruction, addresses are sequentially generated starting from the above address. When the branch by the branch instruction is effected, an address of the branching origin is held in the address generating section in order to make it possible to return the process from the instruction string of the branching destination to the instruction string of the branching origin, if necessary.

Addresses sequentially generated from the address generating section are supplied to the branch history retrieving section, and the branch history is referred to in the branch history retrieving section with the address generated from the address generating section used as a key and whether an instruction corresponding to the address is a branch instruction registered in the branch history or not is checked. When the instruction corresponding to the address is a branch instruction registered in the branch history, branch-possibility information indicating the possibility of the branch derived from the history of the branching result of the branch instruction and a branching-destination address corresponding to the branch-possibility information are fetched from the branch history by the branch history retrieving section and supplied to and held in the prefetch address holding section. On the other hand, when the instruction corresponding to the address is not registered in the branch history (that is, when it is not a branch instruction, or when it is a branch instruction which is not registered in the branch history since it is not executed in the past), the branch history retrieving section does not effect any process until a next address is given.

An instruction in the address held in the prefetch address holding section is fetched by the instruction fetching section when the instruction fetched in the preceding cycle has obtained the branch-possibility information and branching-destination address provided by the branch history retrieving section. At the time of instruction fetch based on an address held in the prefetch address holding section, the instruction fetch is deferred until the instruction buffer becomes available if the instruction buffer has no available capacity, and then the instruction fetch is effected by the instruction fetch section when it becomes possible to effect the instruction fetch.

Further, an instruction of an address generated from the address generating section is fetched by the instruction fetching section when the instruction fetched in the preceding cycle has not obtained the branch-possibility information and branching-destination address provided by the branch history retrieving section.

The thus fetched instruction is stored in the instruction buffer.

In accordance with a second aspect of the present invention, an instruction controlling system is provided in a pipeline processor for storing the history of information on the result of past execution of branch instructions, addresses in which the branch instructions are stored, and branching-destination addresses of the branch instructions when the branch is taken as branch history into a branch history storing section and processing the instruction fetch in a pipeline fashion prior to the instruction execution based on the content of the branch history and includes first to third address generating sections, branch history retrieving section, first to third prefetch address holding sections and instruction fetch section.

The first to third address generating sections generate addresses which start from predetermined addresses and are respectively incremented by preset amounts at a time. The addresses generated from the respective address generating sections correspond to instruction strings each including a sequence of instructions. One of the outputs of the first to third address generating sections is made effective to generate a sequence of addresses, and while the output of one of the address generating sections is kept effective, the address values of the other two address generating sections whose outputs are made ineffective are not incremented and held at the previous address values.

When a branch instruction is present in the instruction string corresponding to the addresses generated from one of the first to third address generating sections which is made effective and the branch of the branch instruction is taken, then one of the remaining two address generating sections is made effective and generates addresses starting from the branching-destination address and incremented by a preset amount at a time. For achieving this operation, when a prefetch address of the branching destination obtained from the branch history is fetched by the instruction fetch section, one of the address generating sections sequentially generates addresses starting from an address which is determined by incrementing the prefetch address by a preset amount. Further, when a branching-destination address other than the prefetch address is obtained by execution of the branch instruction, one of the address generating sections sequentially generates addresses starting from the above address.

The branch history retrieving section refers to the branch history for addresses sequentially generated from one of the first to third address generating sections whose output is made effective so as to determine whether an instruction stored in the address is a branch instruction registered in the branch history or not (for example, whether the address is registered in the branch history or not). When the instruction stored in the address is a branch instruction registered in the branch history, the branch history retrieving section fetches branch-possibility information indicating the possibility of the branch derived from the history of the branching result of the branch instruction and a branching-destination address corresponding to the branch-possibility information from the branch history and supplies the same to one of the first to third prefetch address holding sections. On the other hand, when the instruction stored in the address is not a branch instruction registered in the branch history (that is, when it is not a branch instruction, or when it is a branch instruction which is not registered in the branch history since it is not executed in the past), the branch history retrieving section does not effect any process until a next address is given.

Each of the first to third prefetch address holding sections holds a branching-destination address of the branch instruction to prefetch an instruction of the branching destination when the branch-possibility information is obtained in the branch history retrieving section. The first to third prefetch address holding sections correspond to the first to third address generating sections, and one of the first to third prefetch address holding sections which corresponds to one of the first to third address generating sections which is made effective at this time is used. The first to third prefetch address holding sections hold the branching-destination address until the instruction stored in the branching-destination address is fetched.

The instruction fetch section fetches an instruction stored in the address generated by one of the address generating sections which is made effective or the address held in one of the prefetch address holding sections which is made effective.

That is, the instruction fetching section fetches an instruction stored in the address held in a corresponding one of the prefetch address holding sections when the instruction fetched in the preceding cycle has obtained the branch-possibility information and branching-destination address provided by the branch history retrieving section, and fetches an instruction of an address generated from one of the address generating sections which is made effective at this time when the instruction fetched in the preceding cycle has not obtained the branch-possibility information and branching-destination address provided by the branch history retrieving section. At the time of instruction fetch based on an address held in the prefetch address holding section, the instruction fetch section defers the instruction fetch until the instruction buffer becomes available if the instruction buffer has no available capacity, and then effects the instruction fetch when it becomes possible to effect the instruction fetch.

The first to third prefetch address holding sections correspond to the first to third address generating sections to make respective pairs, and one of the pairs is used for generating addresses of an instruction string in the main pipeline and holding a prefetch address obtained from the branch history for the branch instruction in the instruction string, another pair is used for generating addresses of an instruction string of the branching destination by a branch instruction which is not registered in the branch history and holding a prefetch address obtained from the branch history for the branch instruction in the instruction string, and the other pair (remaining one pair) is used for generating addresses of an instruction string of the branching destination by a branch instruction obtained in the branch history and holding a prefetch address obtained from the branch history for the branch instruction in the instruction string, for example.

That is, in the above instruction control system, when the pipeline control is effected to effect the instruction fetch prior to the instruction execution by using the branch history, control for the instruction fetch is effected by the following procedure.

First, addresses starting from a preset address and incremented by a preset amount at a time are generated from the first to third address generating sections. Among the addresses generated from the first to third address generating sections, a sequence of addresses generated from one of the address generating sections are selectively made effective, and while one of the outputs of the address generating sections is kept effective, the addresses of the other address generating sections whose outputs are made ineffective are not incremented and kept at the previous address values. If a branch instruction is present in the instruction string corresponding to addresses generated from one of the address generating sections and the branch of the branch instruction is taken, then the effective address generating section is changed to another address generating section and addresses starting from the branching-destination address and incremented by a preset amount at a time are generated. That is, in the address generating sections, when a prefetch address of the branching destination obtained from the branch history is fetched by the instruction fetching section, the effective address generating section is changed and addresses are sequentially generated starting from an address which is determined by incrementing the prefetch address by a preset amount. When a branching-destination address other than the prefetch address is obtained by execution of the branch instruction, the effective address generating section is changed and addresses are sequentially generated starting from the above address.

Addresses sequentially generated from the address generating sections are supplied to the branch history retrieving section, and the branch history is referred to in the branch history retrieving section by using the address generated from one of the address generating sections which is made effective as a key and whether an instruction corresponding to the address is a branch instruction registered in the branch history or not is checked. When the instruction corresponding to the address is registered in the branch history, branch-possibility information indicating the possibility of the branch derived from the history of the branching result of the branch instruction and a branching-destination address corresponding to the branch-possibility information are fetched from the branch history by the branch history retrieving section and supplied to and held in one of the prefetch address holding sections which corresponds to one of the address generating sections which is made effective at this time. When the instruction corresponding to the address is not registered in the branch history (that is, when it is not a branch instruction, or when it is a branch instruction which is not registered in the branch history since it is not executed in the past), the branch history retrieving section does not effect any process until a next address is given.

An instruction in the address held in a corresponding one of the prefetch address holding sections is fetched by the instruction fetch section when the instruction fetched in the preceding cycle has obtained the branch-possibility information and branching-destination address provided by the branch history retrieving section. At the time of instruction fetch based on an address held in the prefetch address holding section, the instruction fetch is deferred until the instruction buffer becomes available if the instruction buffer has no available capacity, and then the instruction fetch is effected by the instruction fetch section when it becomes possible to effect the instruction fetch.

Further, an instruction of an address generated from one of the address generating sections which is made effective at this time is fetched by the instruction fetch section when the instruction fetched in the preceding cycle has not obtained the branch-possibility information and branching-destination address provided by the branch history retrieving section.

The thus fetched instruction is stored in the instruction buffer.

It is possible to provide first to third instruction buffers which respectively correspond to the first to third address generating sections and the first to third prefetch address holding sections.

Further, if one or more address generating sections and prefetch address holding sections are additionally provided, it becomes possible to permit each of the address generating sections to generate addresses of an instruction string starting from an address in which the instruction branch is stored and hold the address until it can be fetched even when multiple branch instructions are present in the branching destination of the branch instruction. With the above construction, it becomes possible to further enhance the processing efficiency of the pipeline processor.

The instruction controlling system in the pipeline processor of the present invention not only prefetches and holds an instruction of the branching-destination address, but also holds the branching-destination address until the instruction of the branching-destination address can be fetched. Therefore, even when an instruction fetched prior to the instruction execution is a branch instruction and whether the branch is taken or not can be determined only after the instruction execution, an instruction stored in the branching-destination address can be applied to the instruction executing pipeline without delay when it is determined that the branch of the branch instruction is taken. As a result, the pipeline process can be efficiently effected and a lowering in the performance of the pipeline processor can be effectively prevented even if the frequency of occurrence of the branch instruction is high.

BRIEF DESCRIPTION OF THE DRAWINGS

Other objects and advantages of the invention will become apparent during the following discussion in conjunction with the accompanying drawings, in which:

FIG. 8 is a conceptional diagram schematically showing the status of instruction strings stored in a memory as an example for illustrating the operation of the instruction controlling system of FIG. 5;

DETAILED DESCRIPTION OF THE PREFERRED EMBODIMENTS

Embodiment 1

Figure 1:
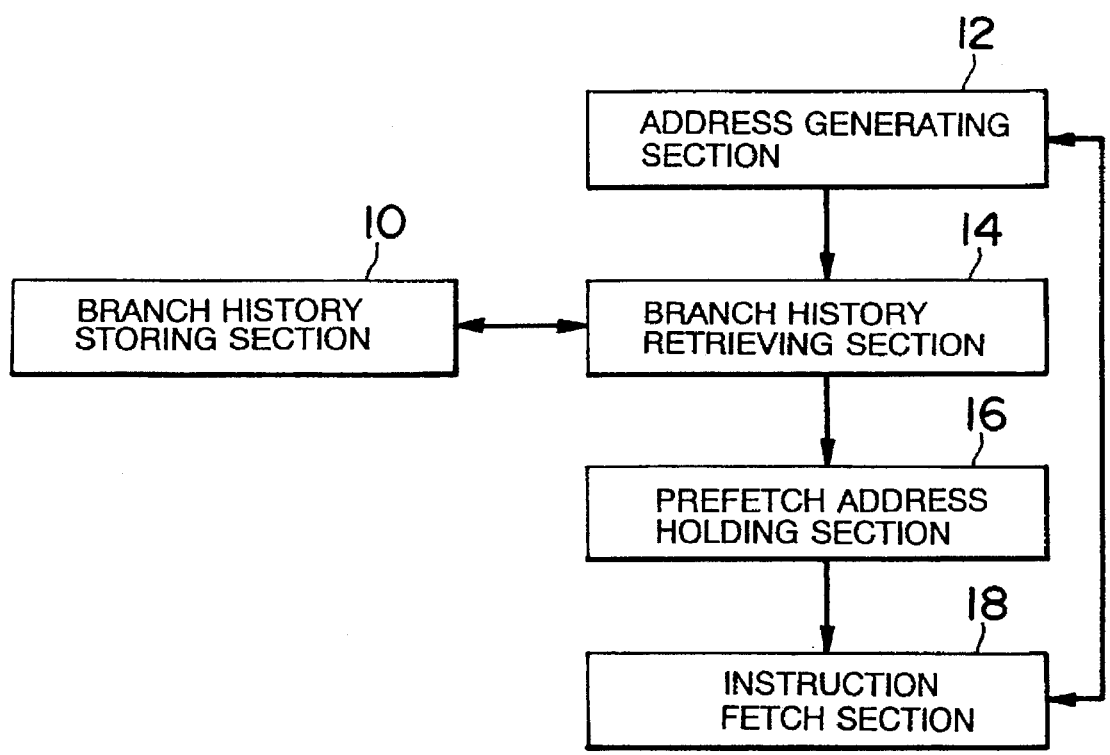
FIG. 1 is a block diagram showing the construction of an instruction controlling system in a pipeline processor according to a first embodiment of the present invention.

FIG. 1 shows the principle construction of an "instruction controlling system in a pipeline processor" according to a first embodiment of the present invention.

In the pipeline processor to which the instruction controlling system shown in FIG. 1 is applied, the history of information on the result of past execution of branch instructions, addresses in which the branch instructions are stored, and branching-destination addresses of the branch instructions when the branch is taken as branch history into a branch history storing section 10 and the instruction fetch is processed in a pipeline fashion prior to the instruction execution based on the content of the branch history. In the pipeline processor, an instruction fetch pipeline for instruction fetch and an instruction execution pipeline for instruction execution are independently operated.

The instruction controlling system in the pipeline processor shown in FIG. 1 constructs the main portion of the instruction fetch pipeline and includes the branch history storing section 10, an address generating section 12, branch history retrieving section 14, prefetch address holding section 16 and instruction fetch section 18.

The address generating section 12 generates addresses starting from a predetermined address and incremented by a preset amount at a time. The addresses correspond to an instruction string including a sequence of instructions. When a branch instruction is present in the instruction string corresponding to the addresses generated from the address generating section 12 and the branch of the branch instruction is taken, then the address generating section 12 generates addresses starting from the branching-destination address and incremented by a preset amount at a time. For achieving this operation, when the instruction fetch section 18 fetches a prefetch address of the branching destination obtained from the branch history stored in the branch history storing section 10, the address generating section 12 sequentially generates addresses starting from an address which is determined by incrementing the prefetch address by a preset amount. When a branching-destination address other than the prefetch address is obtained by execution of the branch instruction, the address generating section 12 sequentially generates addresses starting from the above address.

The branch history retrieving section 14 refers to the branch history stored in the branch history storing section 10 for addresses sequentially generated from the address generating section 12 so as to determine whether an instruction stored in the address is a branch instruction registered in the branch history or not. For example, whether the branch instruction is registered in the branch history or not can be determined by determining whether the address is registered in the branch history or not.

When the instruction stored in the address is a branch instruction registered in the branch history, the branch history retrieving section 14 fetches branch-possibility information indicating the possibility of the branch derived from the history of the branching result of the branch instruction and a branching-destination address corresponding to the branch-possibility information from the branch history and supplies the them to the prefetch address holding section 16.

On the other hand, when the instruction stored in the address is not registered in the branch history, the branch history retrieving section 14 determines that the instruction is not a branch instruction or it is a branch instruction which is not registered in the branch history since it is not executed in the past. Thus, when the instruction stored in the address is not registered in the branch history, that is, when it is not a branch instruction or it is a branch instruction which is not registered in the branch history since it is not executed in the past, the branch history retrieving section 14 does not effect any process until a next address is given.

The prefetch address holding section 16 holds a branching-destination address of the branch instruction to prefetch an instruction of the branching destination when the branch-possibility information is obtained in the branch history retrieving section 14. The prefetch address holding section 16 holds the branching-destination address until the instruction stored in the branching-destination address is fetched.

The instruction fetching section 18 fetches an instruction stored in an address generated by the address generating section 12 or an address held in the prefetch address holding section 16. That is, the instruction fetching section 18 fetches an instruction of the address held in the prefetch address holding section 16 when the instruction fetched in the preceding cycle has the branch-possibility information and branching-destination address provided by the branch history retrieving section 14, and fetches an instruction of an address generated from the address generating section 12 when the instruction fetched in the preceding cycle does not have the branch-possibility information and branching-destination address provided by the branch history retrieving section 14.

An instruction fetched by the instruction fetch section 18 is supplied to the instruction execution pipeline (which is not shown in FIG. 1) via an instruction buffer (which is not shown in FIG. 1) and used for execution of the instruction.

At the time of instruction fetch based on an address held in the prefetch address holding section 16, the instruction fetch section 18 defers the instruction fetch until the instruction buffer becomes available if the instruction buffer has no available capacity, and then effects the instruction fetch when it becomes possible to effect the instruction fetch.

Figure 2:
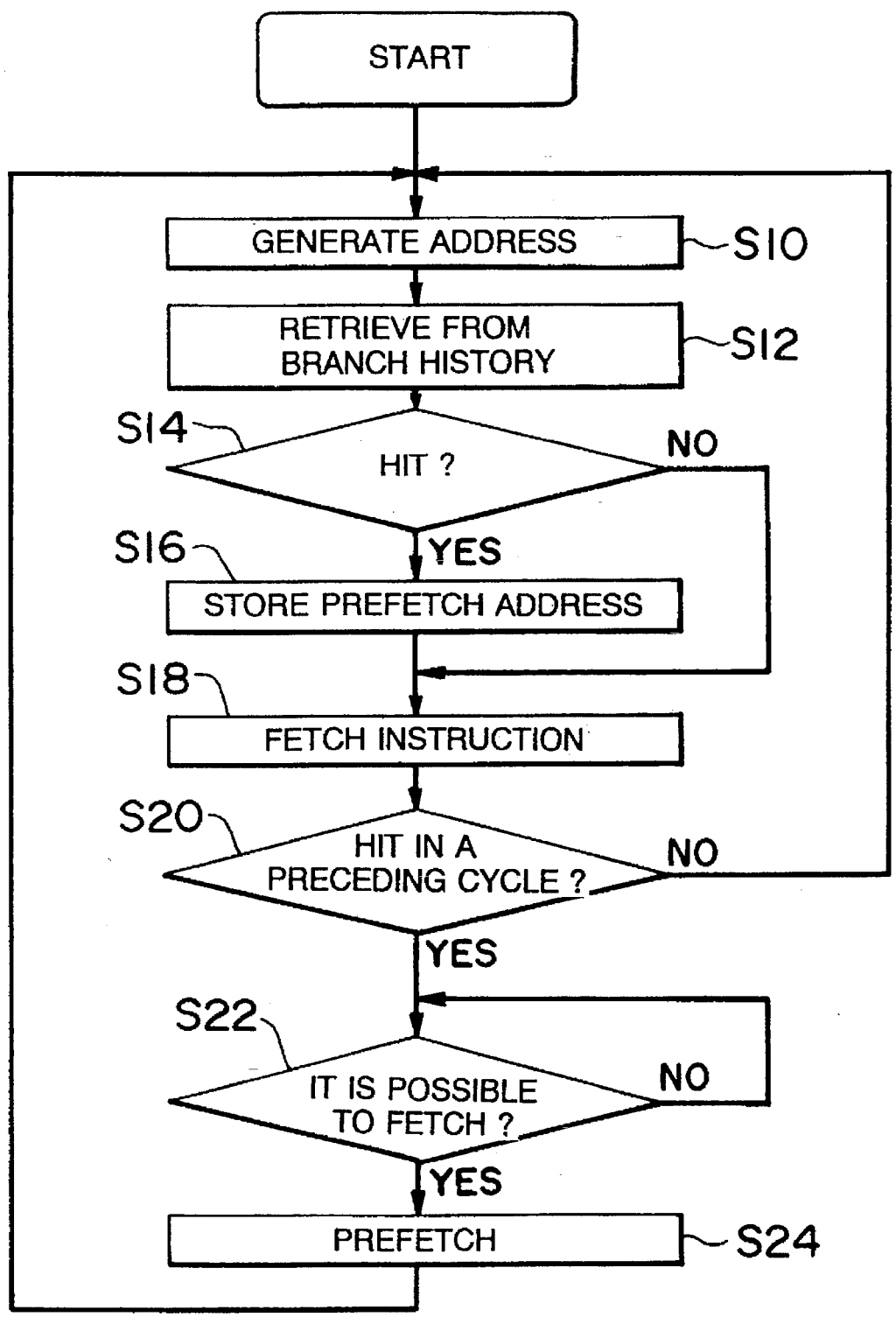
FIG. 2 is a schematic flowchart for illustrating the operation of the instruction controlling system of FIG. 1.

The operation of the instruction controlling system in the pipeline processor of FIG. 1 is explained with reference to the flowchart shown in FIG. 2.

In the above instruction controlling system, control for the instruction fetch is effected by the following procedure when the pipeline control is effected to effect the instruction fetch prior to instruction execution.

First, addresses starting from a preset address and incremented by a preset amount at a time are generated from the address generating section 12 (step S10). If a branch instruction is present in the instruction string corresponding to the addresses generated from the address generating section and the branch of the branch instruction is taken, then addresses starting from the branching-destination address and incremented by a preset amount at a time are generated from the address generating section 12.

That is, in the address generating section 12, when a prefetch address of the branching destination obtained from the branch history is fetched by the instruction fetch section 18, addresses are sequentially generated starting from an address which is determined by incrementing the prefetch address by a preset amount, and when a branching-destination address other than the prefetch address is obtained by execution of the branch instruction, addresses are sequentially generated starting from the above address. When the branch by the branch instruction is effected, an address of the branching origin is held in the address generating section 12 in order to make it possible to return the process from the instruction string of the branching destination to the instruction string of the branching origin, if necessary.

Addresses sequentially generated from the address generating section 12 are supplied to the branch history retrieving section 14. In the branch history retrieving section 14, the branch history is retrieved by using the address generated from the address generating section 12 as a key (step S12). Then, whether an instruction corresponding to the address is a branch instruction registered in the branch history or not is checked in the branch history retrieving section 14 (step S14).

When the instruction corresponding to the address is registered in the branch history, that is, when the branch history is hit, branch-possibility information indicating the possibility of the branch derived from the history of the branching result of the branch instruction and a branching-destination address corresponding to the branch-possibility information are fetched from the branch history by the branch history retrieving section 14 and supplied to and held in the prefetch address holding section 16 (step S16). Then, an instruction corresponding to the above address is fetched by the instruction fetch section 18 (S18).

When it is determined in the step S14 that the instruction corresponding to the address is not registered in the branch history, that is, when the branch history is not hit by the instruction, the step S18 is immediately started and an instruction corresponding to the above address is fetched.

Next, whether the instruction fetched in the preceding cycle, that is, in the step S18 is registered in the branch history or not, that is, whether or not the instruction hits the branch history to derive the branch-possibility information and branching-destination address by the branch history retrieving section 14 is checked (step S20), and when the instruction hits the branch history, whether prefetch is possible or not, that is, whether the instruction buffer has an available capacity or not is checked (step S22). If it is detected in the step S22 that the instruction buffer has no available capacity, fetch of the instruction is deferred until the instruction buffer becomes available, and then an instruction of the address held in the prefetch address holding section 16 is fetched by the instruction fetch section 18 (step S24) when it becomes possible to effect the instruction fetch. After the instruction fetch in the step S24, the process is returned to the step S10 and an address of a next instruction is generated from the address generating section 12.

Further, when it is determined in the step S20 that the instruction fetched in the preceding cycle, that is, in the step S18 does not hit the branch history, the process is returned to the step S10 and an address of a next instruction is generated from the address generating section 12.

Thus, the instruction fetched by the instruction fetch section 18 is stored in the instruction buffer.

In the above instruction controlling system, a branching-destination address based on the branch history is held in the prefetch address holding section 16 until it becomes possible to effect the instruction fetch, and the instruction is fetched and stored into the instruction buffer when it becomes possible to effect the instruction fetch. Therefore, in the instruction fetch pipeline, even in a case wherein the fetched instruction is a branch instruction and whether the branch is taken or not can be determined only after the instruction is executed, an instruction stored in the branching-destination address predicted based on the branch history can be efficiently prefetched so that the prefetched instruction can be applied to the instruction execution pipeline without delay when it is determined that the branch of the branch instruction is taken.

With the above pipeline processor, a lowering in the performance thereof can be effectively prevented even when the frequency of occurrence of the branch instruction is high. Further, as described above, since an address of an instruction to be prefetched is held in the prefetch address holding section 16 until the instruction buffer becomes available and instruction fetch becomes possible, an increase in the amount of hardware such as the instruction buffer can be prevented.

Second Embodiment

Figure 3:
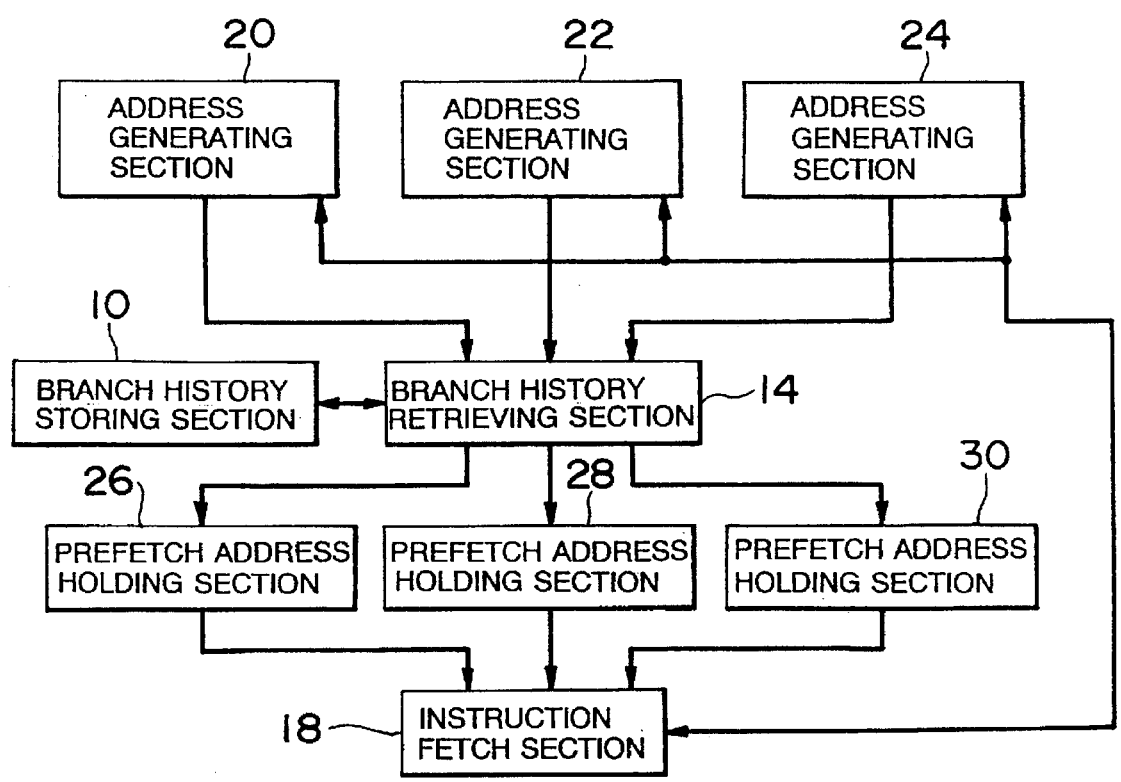
FIG. 3 is a block diagram showing the construction of an instruction controlling system in a pipeline processor according to a second embodiment of the present invention.

FIG. 3 shows the construction of "an instruction controlling system in a pipeline processor" according to a second embodiment of the present invention. In FIG. 3, portions which are the same as those of FIG. 1 are denoted by the same reference numerals and the detail explanation therefor is omitted.

Also, in the pipeline processor to which the instruction controlling system shown in FIG. 3 is applied, an instruction fetch pipeline for instruction fetch and an instruction execution pipeline for instruction execution are independently operated. Like the pipeline processor of FIG. 1, in the pipeline processor of this embodiment, the history of information on the result of past execution of branch instructions, addresses in which the branch instructions are stored, and branching-destination addresses of the branch instructions when the branch is taken as branch history into a branch history storing section 10 and the instruction fetch is processed in a pipeline fashion prior to the instruction execution based on the content of the branch history.

The instruction controlling system shown in FIG. 3 constructs the main portion of the instruction fetch pipeline in the pipeline processor and includes the branch history storing section 10, a branch history retrieving section 14 and instruction fetch section 18 which are substantially the same as those of FIG. 1 and it further includes first, second and third address generating sections 20, 22, 24 and first, second and third prefetch address holding sections 26, 28, 30. The first, second and third prefetch address holding sections 26, 28, 30 respectively correspond to the first, second and third address generating sections 20, 22, 24.

The first to third address generating sections 20 to 24 generate addresses which start from predetermined addresses and are respectively incremented by preset amounts at a time. The addresses generated from the respective address generating sections correspond to instruction strings each including a sequence of instructions. One of the outputs of the first to third address generating sections 20 to 24 is made effective to generate a sequence of addresses, and while the output of one of the address generating sections 20 to 24 is kept effective, the address values of the other two address generating sections whose outputs are made ineffective are not incremented and held at the previous address values.

When a branch instruction is present in the instruction strings corresponding to the addresses generated from one of the first to third address generating sections 20 to 24 which is made effective and the branch of the branch instruction is taken, then one of the remaining two address generating sections is made effective and generates addresses starting from the branching-destination address and incremented by a preset amount at a time. As a result, when a prefetch address of the branching destination obtained from the branch history is fetched by the instruction fetching section, one of the address generating sections 20 to 24 sequentially generates addresses starting from an address which is determined by incrementing the prefetch address by a preset amount. Further, when a branching-destination address other than the prefetch address is obtained by execution of the branch instruction, one of the address generating sections 20 to 24 sequentially generates addresses starting from the above address.

The branch history retrieving section 14 refers to the branch history stored in the branch history storing section 10 for addresses sequentially generated from one of the first to third address generating sections 20 to 24 whose output is made effective so as to determine whether an instruction stored in the address is a branch instruction registered in the branch history or not. For example, whether the branch instruction is registered in the branch history or not can be determined by checking whether the address is registered in the branch history or not.

When the instruction stored in the above address is a branch instruction registered in the branch history, the branch history retrieving section 14 fetches branch-possibility information indicating the possibility of the branch based on the history of the branching result of the branch instruction and a branching-destination address corresponding to the branch-possibility information from the branch history of the branch history storing section 10 and supplies the same to one of the first to third prefetch address holding sections 26 to 30.

On the other hand, when the instruction stored in the above address is not a branch instruction registered in the branch history, the branch history retrieving section 14 determines that the instruction is not a branch instruction, or it is a branch instruction which is not registered in the branch history since it is not executed in the past. Thus, when the instruction stored in the above address is not registered in the branch history, that is, the instruction is not a branch instruction, or it is a branch instruction which is not registered in the branch history since it is not executed in the past, the branch history retrieving section does not effect any process until a next address is given.

Each of the first to third prefetch address holding sections 26 to 30 holds a branching-destination address of the branch instruction to prefetch an instruction of the branching destination when the branch-possibility information is obtained in the branch history retrieving section 14. The first to third prefetch address holding sections 26 to 30 respectively correspond to the first to third address generating sections 20 to 24, and one of the first to third prefetch address holding sections which corresponds to one of the first to third address generating sections 20 to 24 which is made effective at this time is used. The first to third prefetch address holding sections 26 to 30 hold the branching-destination address until the instruction stored in the branching-destination address is fetched.

The instruction fetch section 18 fetches an instruction stored in the address generated by one of the address generating sections 20 to 24 which is made effective or the address held in one of the prefetch address holding sections 26 to 30 which is made effective.

That is, the instruction fetch section 18 fetches an instruction stored in the address held in a corresponding one of the prefetch address holding sections when the instruction fetched in the preceding cycle has the branch-possibility information and branching-destination address provided by the branch history retrieving section 14, and fetches an instruction of an address generated from one of the address generating sections 20 to 24 which is made effective at this time when the instruction fetched in the preceding cycle does not have the branch-possibility information and branching-destination address provided by the branch history retrieving section 14. At the time of instruction fetch based on an address held in one of the prefetch address holding sections 26 to 30, the instruction fetch section 18 defers the instruction fetch until the instruction buffer becomes available if the instruction buffer has no available capacity, and then effects the instruction fetch when it becomes possible to effect the instruction fetch.

The first to third prefetch address holding sections 26 to 30 correspond to the first to third address generating sections 20 to 24 to make respective pairs, and one of the pairs is used for generating addresses of an instruction string in the main pipeline and holding a prefetch address obtained from the branch history for the branch instruction in the instruction string, another pair is used for generating addresses of an instruction string of the branching destination by a branch instruction which is not registered in the branch history and holding a prefetch address obtained from the branch history for the branch instruction in the instruction string, and the other pair (remaining one pair) is used for generating addresses of an instruction string of the branching destination by a branch instruction obtained in the branch history and holding a prefetch address obtained from the branch history for the branch instruction in the instruction string, for example.

Figure 4:
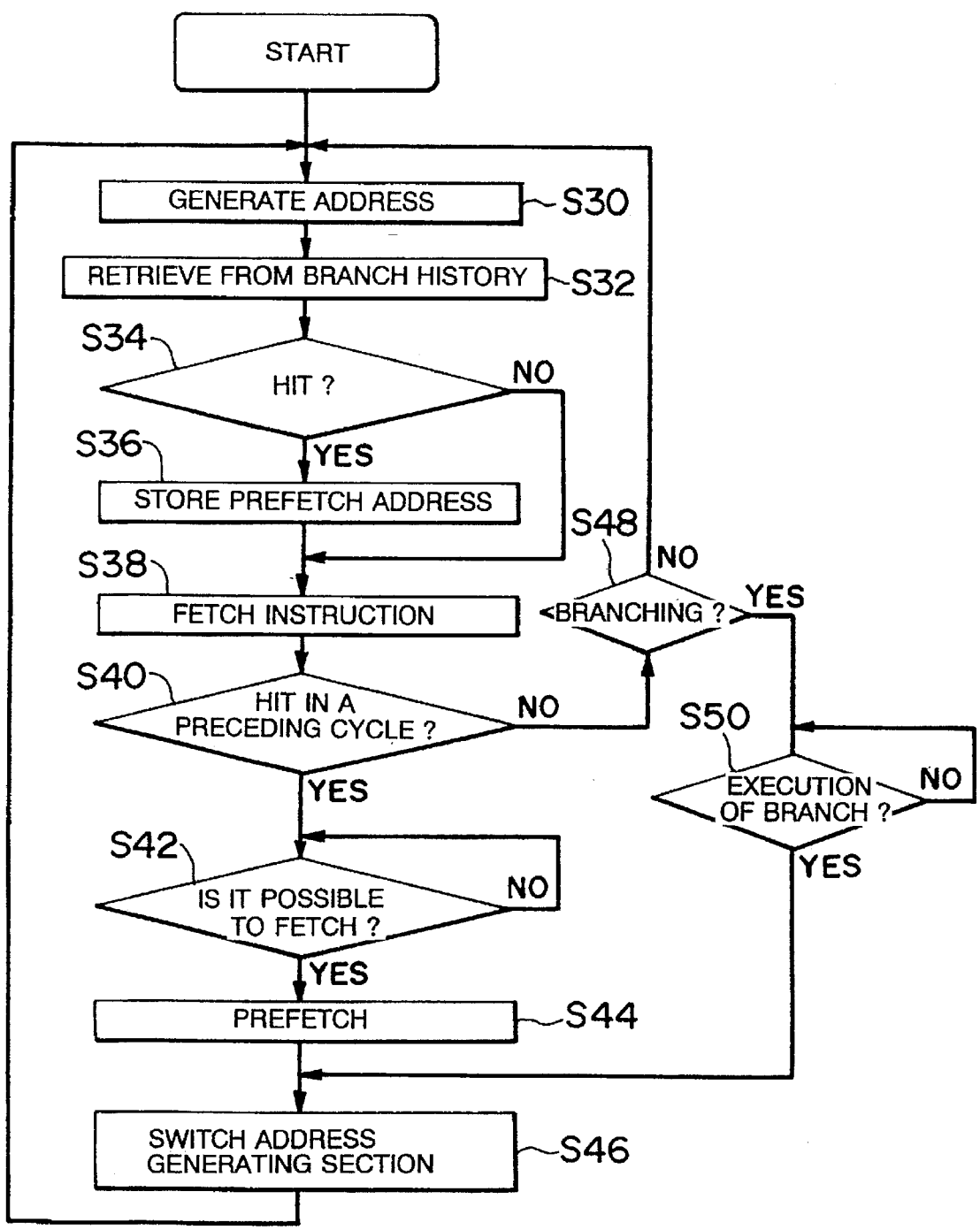
FIG. 4 is a schematic flowchart for illustrating the operation of the instruction controlling system of FIG. 3.

The operation of the instruction controlling system in the pipeline processor of FIG. 3 is explained with reference to the flowchart shown in FIG. 4.

In the above instruction controlling system, control for the instruction fetch is effected by the following procedure when the pipeline control is effected to effect the instruction fetch prior to instruction execution.

First, addresses starting from a preset address and incremented by a preset amount at a time are generated from the first to third address generating sections 20 to 24 (step S30). Among the addresses generated from the first to third address generating sections 20 to 24, a sequence of addresses generated from one of the address generating sections 20 to 24 are selectively made effective. While one of the outputs of the address generating sections 20 to 24 is kept effective, the addresses of the other address generating sections whose outputs are made ineffective are not incremented and kept at the previous address values.

If a branch instruction is present in the instruction string corresponding to addresses generated from one of the address generating sections and the branch of the branch instruction is taken, then the effective address generating section is changed to another address generating section and addresses starting from the branching-destination address and incremented by a preset amount at a time are generated.

That is, in the address generating sections 20 to 24, when a prefetch address of the branching destination obtained from the branch history is fetched by the instruction fetch section, the effective address generating section is changed and addresses are sequentially generated starting from an address which is determined by incrementing the prefetch address by a preset amount. When a branching-destination address other than the prefetch address is obtained by execution of the branch instruction, the effective address generating section is changed and addresses are sequentially generated starting from the above address.

Addresses sequentially generated from one of the address generating sections 20 to 24 in the step S30 are supplied to the branch history retrieving section 14, and the branch history is retrieved in the branch history retrieving section 14 by using an address generated from one of the address generating sections which is made effective as a key (step S32). Then, whether an instruction corresponding to the address is a branch instruction registered in the branch history or not is checked (step S34).

When the instruction corresponding to the address is registered in the branch history, that is, when the branch history is hit, branch-possibility information indicating the possibility of the branch derived from the history of the branching result of the branch instruction and a branching-destination address corresponding to the branch-possibility information are fetched from the branch history by the branch history retrieving section 14 and supplied to and held in one of the first to third prefetch address holding sections 26 to 30 (step S36). Then the instruction corresponding to the address is fetched by the instruction fetch section 18 (step S38).

When it is determined in the step S34 that the instruction corresponding to the address is not registered in the branch history, that is, when the instruction does not hit the branch history, the step S38 is immediately started to fetch an instruction corresponding to the above address.

Next, whether the instruction fetched in the preceding cycle, that is, in the step S38 is registered in the branch history or not, that is, whether or not the instruction hits the branch history is checked (step S40), and when the instruction hits the branch history, whether prefetch is possible or not, that is, whether the instruction buffer has an available capacity or not is checked (step S42). If it is detected in the step S42 that the instruction buffer has no available capacity, fetch of the instruction is deferred until the instruction buffer becomes available, and then an instruction of the address held in a corresponding one of the prefetch address holding sections 26 to 30 is fetched by the instruction fetching section 18 (step S44) when it becomes possible to effect the instruction fetch. After the instruction fetch in the step S44, one of the address generating sections 20 to 24 whose output is made effective is changed (step S46) and the process is returned to the step S30 and a next address of an instruction string succeeding the fetched instruction is generated from one of the address generating sections 20 to 24.

Further, when it is determined in the step S40 that the instruction fetched in the preceding cycle, that is, in the step S38 does not hit the branch history, whether the instruction is a branch instruction or not is checked (step S48), and if it is not a branch instruction, the process is returned to the step S30 and a next address is generated from one of the address generating sections 20 to 24.

If it is determined in the step S48 that the instruction is a branch instruction, the step S46 is started after the branch instruction is executed (step S50), and the process is returned to the step S30 after one of the address generating sections 20 to 24 whose output is made effective is changed, and a next address of an instruction string succeeding the fetched instruction is generated.

Thus, the instruction fetched by the instruction fetching section 18 is stored in the instruction buffer.

In the above instruction controlling system, a branching-destination address based on the branch history is held in the prefetch address holding sections 26 to 30 until it becomes possible to effect the instruction fetch, and the instruction is fetched and stored into the instruction buffer when it becomes possible to effect the instruction fetch. Therefore, in the instruction fetch pipeline, even in a case where the fetched instruction is a branch instruction and whether the branch is taken or not can be determined only after the instruction is executed, an instruction stored in the branching-destination address predicted based on the branch history can be efficiently prefetched so that the prefetched instruction can be applied to the instruction execution pipeline without delay when it is determined that the branch of the branch instruction is taken.

With the above pipeline processor, a lowering in the performance thereof can be more effectively prevented even when the frequency of occurrence of the branch instruction is high. Further, as described above, since an address of an instruction to be prefetched is held in the prefetch address holding sections 26 to 30 until the instruction buffer becomes available and instruction fetch becomes possible, an increase in the amount of hardware such as the instruction buffer can be prevented.

It is possible to provide first to third instruction buffers which respectively correspond to the first to third address generating sections and the first to third prefetch address holding sections.

Further, if one or more address generating sections and prefetch address holding sections are additionally provided, it becomes possible to permit each of the address generating sections to generate addresses of an instruction string starting from an address in which the instruction branch is stored and hold the address until the instruction fetch becomes possible even when multiple branch instructions are present in the branching destination of the branch instruction. With the above construction, it becomes possible to further enhance the processing efficiency of the pipeline processor.

Third Embodiment

Figure 5:
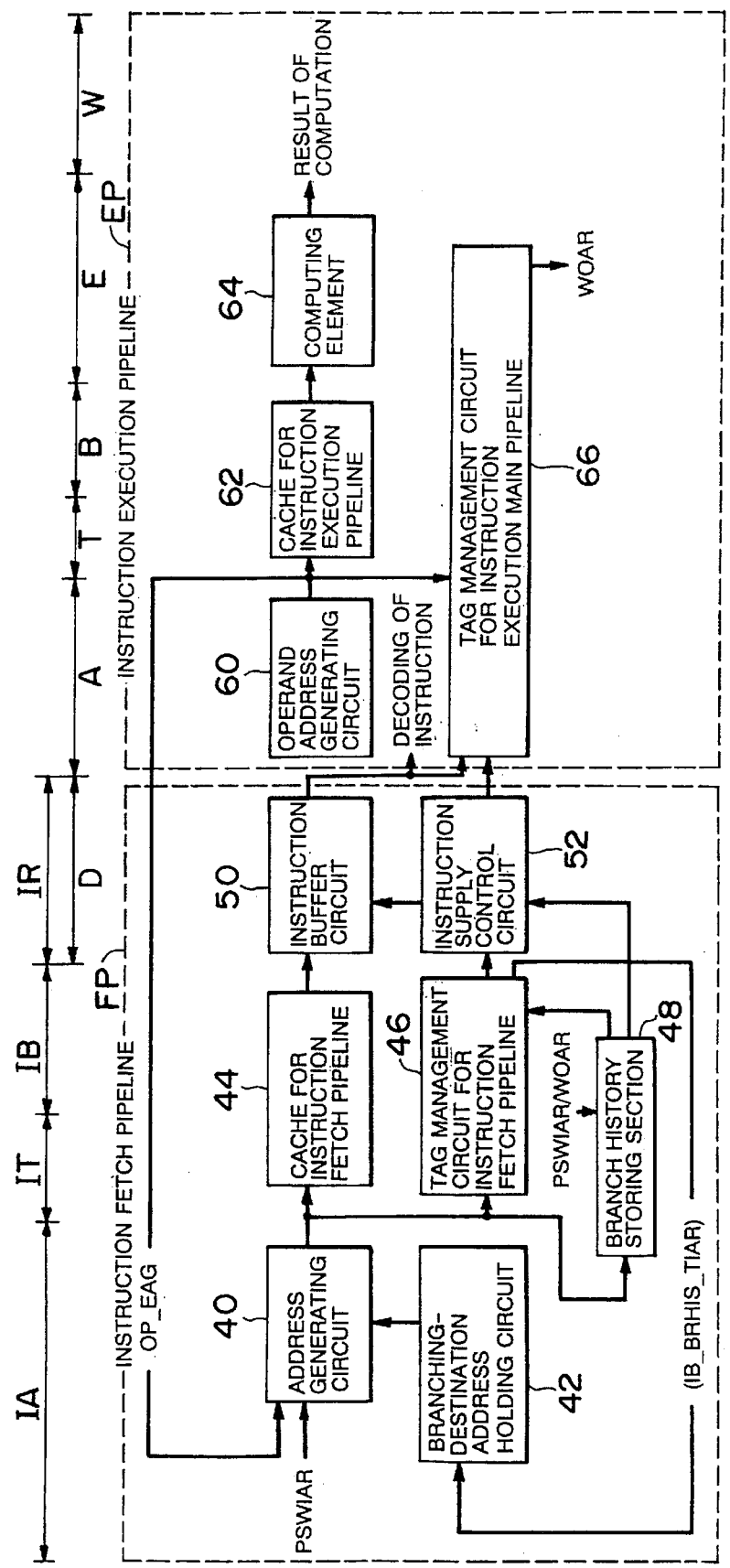
FIG. 5 is a block diagram showing the construction of an instruction controlling system in a pipeline processor according to a third embodiment of the present invention.

FIG. 5 shows the construction of a pipeline processor to which a more concrete instruction controlling system according to a third embodiment of the present invention is applied.

The pipeline processor of FIG. 5 includes an instruction fetch pipeline FP and instruction execution pipeline EP, and the instruction fetch pipeline FP and instruction execution pipeline EP are independently controlled in a pipeline fashion. The instruction fetch pipeline FP fetches an instruction. The instruction execution pipeline EP executes an instruction fetched by the instruction fetch pipeline FP.

The instruction fetch pipeline FP has four stages of process operating cycles. That is, the respective stages of the processes of the instruction fetch pipeline FP include an instruction address calculating cycle IA (which is hereinafter referred to as "IA" cycle), instruction address converting cycle IT (which is hereinafter referred to as "IT" cycle), readout cycle IB (which is hereinafter referred to as "IB" cycle), and synchronizing cycle IR (which is hereinafter referred to as "IR" cycle), and the process of the instruction fetch pipeline FP is effected by repeatedly effecting the four cycles of "IA→IT→IB→IR".

In the IA cycle, an instruction address in which an instruction is stored is calculated in order to fetch the instruction. In the IT cycle, the derived instruction address is converted. In the IB cycle, readout from the buffer is effected. The IR cycle is a cycle for synchronization with the instruction execution pipeline EP.

The instruction execution pipeline EP has six stages of process operating cycles. That is, the respective stages of the processes of the instruction execution pipeline EP include an instruction decoding cycle D (which is hereinafter referred to as "D" cycle), operand address calculation cycle A (which is hereinafter referred to as "A" cycle), operand address converting cycle T (which is hereinafter referred to as "T" cycle), operand readout cycle B (which is hereinafter referred to as "B" cycle), operation executing cycle E (which is hereinafter referred to as "E" cycle), and result storage cycle W (which is hereinafter referred to as "W" cycle), and the process of the instruction execution pipeline EP is effected by repeatedly effecting the six cycles of "D→A→T→B→E→W".

In the D cycle, instruction decoding is effected. In the A cycle, an address of an operand in the main memory associated with the fetched instruction is calculated. In the B cycle, readout of an operand from the main memory is effected. In the E cycle, the operation process of the fetched instruction is effected. In the W cycle, the operation result is stored.

The instruction fetch pipeline FP includes an address generating circuit 40, branching-destination address holding circuit 42, cache 44 for instruction fetch pipeline, tag management circuit 46 for instruction fetch pipeline, branch history storage section 48, instruction buffer circuit 50 and instruction supply controlling circuit 52.

The instruction execution pipeline EP includes an operand address generating circuit 60, cache 62 for instruction execution pipeline, computing element 64 and tag management circuit 66 for instruction execution pipeline.

Each of the sections of the instruction fetch pipeline FP is explained. The detail construction of the address generating circuit 40 and branching-destination address holding circuit 42 is shown in FIG. 6 and the detail construction of the control circuit for the address generating circuit 40 is shown in FIG. 7.

Figure 6:
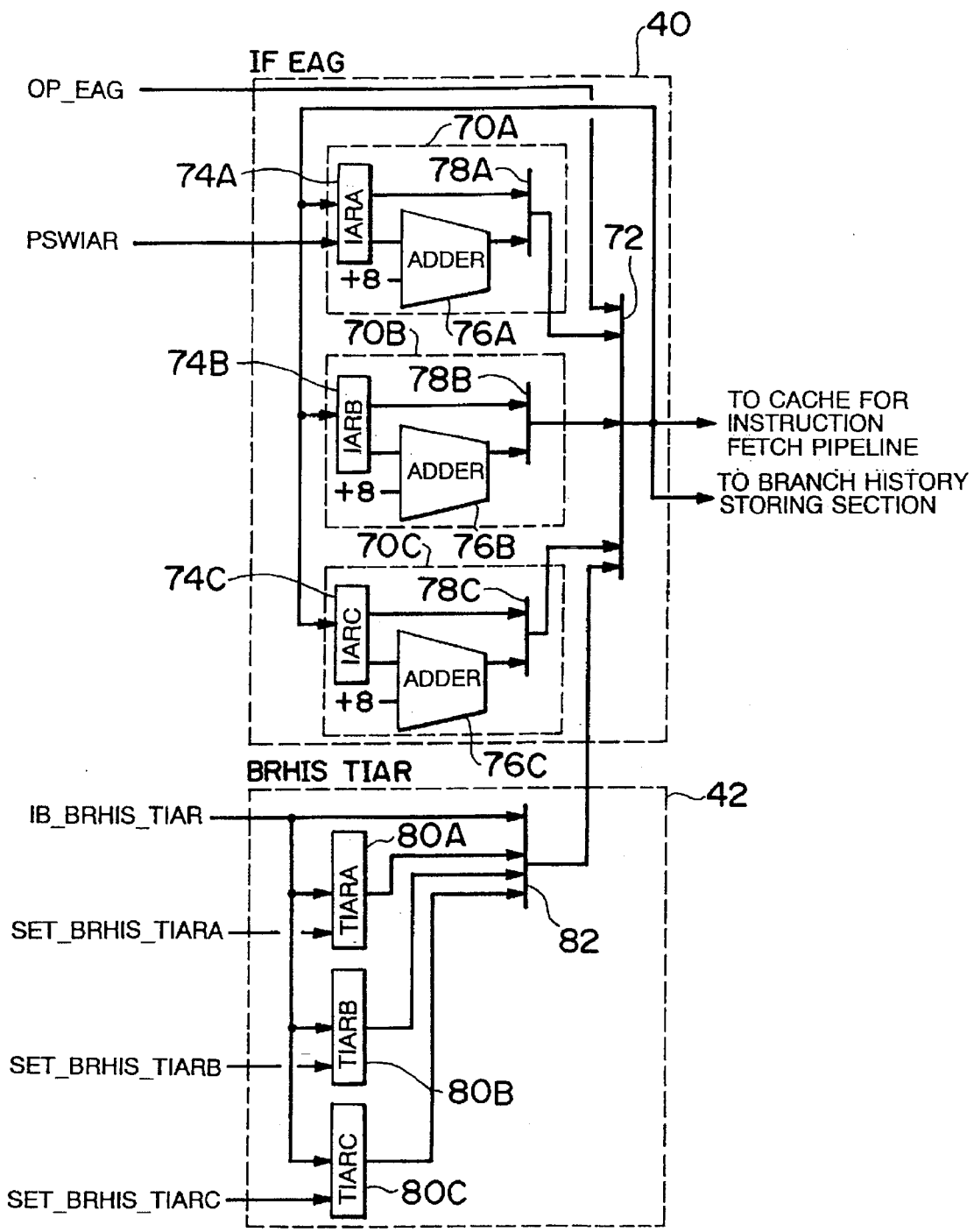
FIG. 6 is a schematic block diagram specifically showing part of the construction of the instruction controlling system of FIG. 5.
Figure 7:
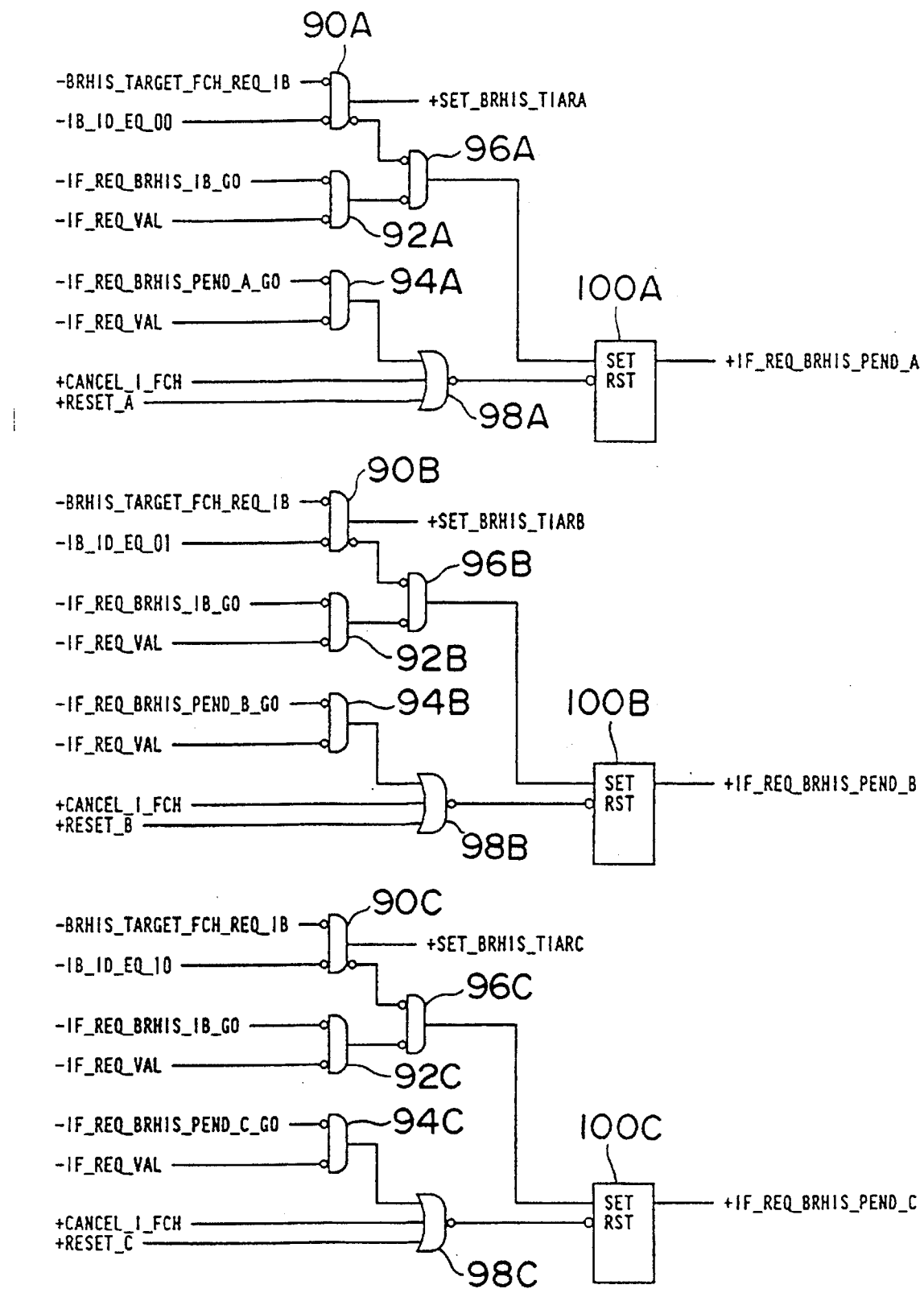
FIG. 7 is a schematic block diagram more specifically showing part of the construction of FIG. 6.

As shown in FIG. 6, the address generating circuit 40 includes first, second and third address calculating sections 70A, 70B and 70C and a selection circuit The first, second and third address calculating sections 70A, 70B and 70C correspond to instruction strings of three different series, that is, A series, B series and C series. The A-series, B-series and C-series instruction strings are distinguished from one another by identifiers ID, and the identifiers thereof are respectively set such that ID=00, ID=01 and ID=10, for example.

The A-series address calculating section 70A includes an A-series address register 74A, adder 76A and selection circuit 78A. The B-series address calculating section 70B includes a B-series address register 74B, adder 76B and selection circuit 78B. The C-series address calculating section 70C includes a C-series address register 74C, adder 76C and selection circuit 78C.

In this case, each of the A series to C series corresponds to an instruction string of (1) a series of instruction to be executed in the instruction execution pipeline EP, that is, main pipeline, (2) a series of instruction of the branching destination by execution of a branch instruction which does not hit the branch history in the instruction execution pipeline EP, or (3) a series of instruction of the branching destination of a branch instruction which has hit the branch history in the instruction execution pipeline EP. Allocation of the instruction strings to the A series to C series is not necessarily fixed and an available one of the series is adequately selected when allocation is required.

In the address calculating section 70A/70B/70C (in this case, description of symbols divided by "/" indicates one of the symbols), an instruction address is set in the address register 74A/74B/74C according to one of the following conditions (a) and (b).

(a) When the pipeline is set into the operative state:

When the pipeline processor is set into the operative state, an instruction address (PSWIAR) indicated by a program status word, that is, a head address of an instruction string to be fetched is given to the address register 74A/74B/74C.

(b) When a sequence of addresses of an instruction string are created:

At the time other than the time when the pipeline processor starts the operation, an instruction address which is selected at the immediately preceding time by the selection circuit 72 and output from the address generating circuit 40 is fed back and given to the address register 74A/74B/74C.

The adder 76A/76B/76C adds a fetched instruction length, for example, 8 bytes to an address fed back from the selection circuit 72 to create an address used for fetching a next instruction of an instruction string corresponding to the series. Thus, an address for fetching an instruction string corresponding to each series is sequentially created.

The selection circuit 78A/78B/78C selects one of an address (IARA/IARB/IARC) held in the address register 74A/74B/74C of each series and an address of addition result obtained in the adder 76A, 76B/76C.

For example, when a branch instruction in an A-series instruction string by an address created in the address calculating section 70A hits the branch history, successive instruction string following the branching-destination address of the branch instruction obtained from the branch history are created by use of the B-series address register 74B of the address calculating section 70B. At this time, the C-series address calculating section 70C having the address register 74C is set in an available state to make ready for instruction fetch by an address which is obtained in the operand address generating circuit 60 of the instruction execution pipeline EP by execution of the branch.

The selection circuit 72 selects one of an address output from the selection circuit 78A, an address output from the selection circuit 78B, an address output from the selection circuit 78C, an operand address (OP_EAG) created in the operand address generating circuit 60 of the instruction execution pipeline EP, and an address output from the branching-destination address holding circuit 42, and supplies the selected address to the cache 44 for instruction fetch pipeline, tag management circuit 46 for instruction fetch pipeline and branch history 48, and feeds back the selected address to one of the address registers 74A, 74B and 74C for a corresponding series.

As shown in FIG. 6, the branching-destination address holding circuit 42 includes first, second and third address holding sections 80A, 80B and 80C and a selection circuit 82. Like the case of the address generating circuit 40, the first, second and third address holding sections 80A, 80B and 80C correspond to three series of A series (ID=00), B series (ID=01) and C series (ID=10).

The address holding section 80A/80B/80C is constructed by an address register for holding an address (TIARA)/(TIARB)/(TIARC). A tag (IB_BRHIS_TIAR) which will be described later is supplied to the address register of the address holding section 80A/80B/80C. The tag (IB_BRHIS_TIAR) is a tag for supplying a branching-destination address to fetch a branching-destination address obtained from the branch history of the branch history storage section 48 in the IB cycle of the instruction fetch pipeline FP. A control signal (SET_BRHIS_TIARA)/(SET_BRHIS_TIARB)/(SET_BRHIS_TIARC) is a control signal for permitting the tag (IB_BRHIS_TIAR) to be held in the address holding section 80A/80B/80C as an address (TIARA)/(TIARB)/(TIARC). That is, if an instruction stored in the branching-destination address of the branch instruction can be fetched, the tag (IB_BRHIS_TIAR) is not held in the address holding section 80A/80B/80C, but if it cannot be fetched, it is held in the address holding section 80A/80B/80C until it becomes possible to fetch the instruction. In this case, the address holding section 80A, address (TIARA), and control signal (SET_BRHIS_TIARA) correspond to the A series, the address holding section 80B, address (TIARB), and control signal (SET_BRHIS_TIARB) correspond to the B series, and the address holding section 80C, address (TIARC), and control signal (SET_BRHIS_TIARC) correspond to the C series. Therefore, the address holding sections 80A to 80C correspond to the address calculating sections 70A to 70C, respectively.

The selection circuit 82 selects one of the address held in the address holding section 80A, the address held in the address holding section 80B, the address held in the address holding section 80C, and the tag (IB_BRHIS_TIAR) and supplies the selected address or tag to the selection circuit 72.

When the branch instruction is executed in the instruction execution pipeline EP, whether the branch is taken or untaken is determined. At this time, in those of the series of the instruction fetch which have fetched unnecessary instructions, the fetched instructions are cancelled and the corresponding series are initialized so as to be used for instruction fetch of the branching destination of another branch which is newly generated.

The above address generating circuit 40 is controlled by a control circuit as shown in FIG. 7.

The control circuit is constructed by OR gates 90A/90B/90C, 92A/92B/92C, 94A/94B/94C, 96A/96B/96C, AND gate 98A/98B/98C, and RS (set/reset) flip-flop 100A/100B/100C, and generates control signals (+SET_BRHIS_TIARA/+SET_BRHIS_TIARB/+SET_BRHIS_TIARC and −IF_REQ_BRHIS_PEND_A/−IF_REQ_BRHIS_PEND_B/−IF_REQ_BRHIS_PEND_C) based on various control signals (−BRHIS_TARGET_FCH_REQ_IB, −IB_ID_EQ_00/−IB_ID_EQ_01/−IB_ID_EQ_10, −IF_REQ_BRHIS_IB_GO, −IF_REQ_VAL, −IF_REQ_BRHIS_PEND_A_GO/−IF_REQ_BRHIS_PEND_B_GO/−IF_REQ_BRHIS_PEND_C_GO, +CANCEL_I_FCH and +RESETS_A/+RESET_B/+RESET_C).

The cache 44 for instruction fetch pipeline includes a RAM (Random Access Memory) and is connected to a main memory device which is not shown in the drawing so as to cache the readout of an instruction from the main memory device when the instruction is fetched. In other words, an instruction (instruction word) stored in an address generated from the address generating circuit 40 is read out from the main memory via the cache 44 for instruction fetch pipeline and the cache 44 for instruction fetch pipeline caches the readout of the instruction.

That is, when an instruction stored in an instruction address of the main memory device according to an address generated from the address generating circuit 40 and corresponding to a to-be-fetched instruction in the main memory device and if the corresponding instruction is already read out from the main memory device and stored in the cache 44 for instruction fetch pipeline by the past instruction readout operation or the like (if the cache is hit), the instruction is read out from the cache 44 for instruction fetch pipeline and supplied to the instruction buffer circuit 50. At this time, if the instruction of the corresponding instruction address is not retrieved from the cache 44 for instruction fetch pipeline (if the cache is not hit), an instruction is fetched from the main memory device and supplied to the instruction buffer circuit 50.

The tag management circuit 46 for instruction fetch pipeline manages tag information of a branch instruction obtained based on the index of the branch history of the branch history storage section 48 and supplies the tag information to a required portion in synchronism with the execution cycle of the instruction fetch pipeline.

In this case, the branching-destination instruction address (IB_BRHIS_TIAR) contained in the tag information of the branch instruction obtained from the branch history is supplied to the address holding sections 80A to 80C and selection circuit 82 of the branching-destination address holding circuit 42. When the branching-destination instruction address (IB_BRHIS_TIAR) is selected by the selection circuit 82, it is supplied to the selection circuit 72 of the address generating circuit 40, and when it is also selected by the selection circuit 72, it is supplied to the cache 44 for instruction fetch pipeline and used for instruction fetch in the IB cycle.

The branch history storage section 48 stores branch history which is history information of the past branch instructions. The branch history manages the relation between the address in which the branch instruction is stored and the branching-destination address determined when the branch instruction is taken together with control information indicating whether the branch is taken or not.

The branch history data is registered in the W cycle of execution of the branch instruction by the instruction execution pipeline EP.

The reason why the branch history is written in the W cycle is that the result of the branch of the branch instruction (taken/untaken) is determined in the W cycle, the instruction address (PSWIAR) indicated by the program status word in the W cycle indicates an address of an instruction which is now executed, and it is preferable.

For registration of the branch history data, the branch history storage section 48 is supplied with an address (PSWIAR) of an instruction indicated by a program status word (PSW), and tags (WOAR) and (W_BR_TKN) in the W cycle of the instruction execution pipeline EP. The tag (WOAR) is a tag of an address of the operand in the main memory device and obtained by shifting an operand address (OP_EAG) output from the operand address generating circuit 60 along the pipeline. The tag (W_BR_TKN) is a tag indicating that the branch instruction is executed and the result of execution indicates that the branch is taken.

The branch history of the branch history storage section 48 is referred to in synchronism with the operation of the instruction fetch pipeline FP such that an output of the address generating circuit 40 is set in an address in the IA cycle and accessed in the IT cycle. When a corresponding instruction hits the branch history, information indicating that the branch history is hit and indicating the branching-destination address (IB_BRHIS_TIAR) is obtained from the branch history storage section 48.

The thus obtained information indicating that the branch history is hit and indicating the branching-destination address (IB_BRHIS_TIAR) is immediately used for instruction fetch in the IB cycle in some case, and used to create a tag (IF_REQ_BRHIS_PEND_A)/(IF_REQ_BRHIS_PEND_B)/(IF_REQ_BRHIS_PEND_C) indicating wait for instruction fetch in the tag management circuit 46 for instruction fetch pipeline according to ID of a series of instruction fetch which hits the branch history and hold the branching-destination address (IB_BRHIS_TIAR) in the address holding section 80A/80B/80C of the branching-destination address holding circuit 42 as the address (TIARA)/(TIARB)/(TIARC) so as to use the same for instruction fetch later in the other case.

As described before, in this system, three series of instruction fetch are provided, but one series is kept in the available state to prepare for a case wherein one series is exclusively used by an instruction executed in the instruction execution pipeline EP, a branch history which does not hit the branch history of the branch history storage section 48 is executed in the instruction execution pipeline EP and instruction fetch of the branch destination from an operand address (OP_EAG) is executed. For this purpose, control is made such that only one series of the instruction fetch of the branch destination from the branch history can be permitted at the same time.

Therefore, the fact that instruction fetch of the branch destination from the branch history of the branch history storage section 48 is effected becomes one reason for inhibiting it from being immediately used for the instruction fetch in the IB cycle when the branch history is hit.

Further, even when a request of instruction fetch is suppressed by the fact that preceding instruction fetch does not hit the cache in the IB cycle or the like, instruction fetch of the branching destination from the branch history cannot be immediately effected in the IB cycle.

In either case, a tag (IF_REQ_BRHIS_PEND_A)/(IF_REQ_BRHIS_PEND_B)/(IF_REQ_BRHIS_PEND_C) indicating wait for instruction fetch is created in the tag management circuit 46 for instruction fetch pipeline according to ID of instruction fetch which has hit the branch history of the branch history storage section 48, and a branching-destination address (IB_BRHIS_TIAR) is held in the address holding section 80A/80B/80C of the branching-destination address holding circuit 42. In FIG. 7, this corresponds to a case wherein a tag (IF_REQ_BRHIS_PEND_A)/(IF_REQ_BRHIS_PEND_B)/(IF_REQ_BRHIS_PEND_C) indicating wait for instruction fetch is set in a set/reset flip-flop, and in FIG. 6, this indicates a case wherein a branching-destination address (IB_BRHIS_TIAR) is set in the address holding section 80A/80B/80C of the branching-destination address holding circuit 42.

In this case, information of the branching-destination address (IB_BRHIS_TIAR) of the branch history held in the address holding section 80A/80B/80C as the address (TIARA)/(TIARB)/(TIARC) is used for instruction fetch to effect fetch of the inhibited instruction when the inhibiting condition of instruction fetch of the branching destination described before is cancelled. However, in some cases, the information may not be used when a corresponding series of the instruction fetch is cancelled by determination of the preceding branch before the instruction fetch is effected, for example. Thus, when the fetch waiting instruction is cancelled, a control signal (CANCEL_I_FCH) or (RESET_A)/(RESET_B)/(RESET_C) shown in FIG. 7 is generated.

The instruction buffer circuit 50 is supplied with an instruction read out from the cache 44 for instruction fetch pipeline and stores the same.

The instruction supply control circuit 52 selects an instruction string of the branch destination buffered in the instruction buffer circuit 50 and applies the same to the instruction execution pipeline EP when an instruction word applied to the instruction execution pipeline EP is a branch instruction which hits the branch history.

The operation of the pipeline processor with the above construction is specifically explained below.

Figure 9:
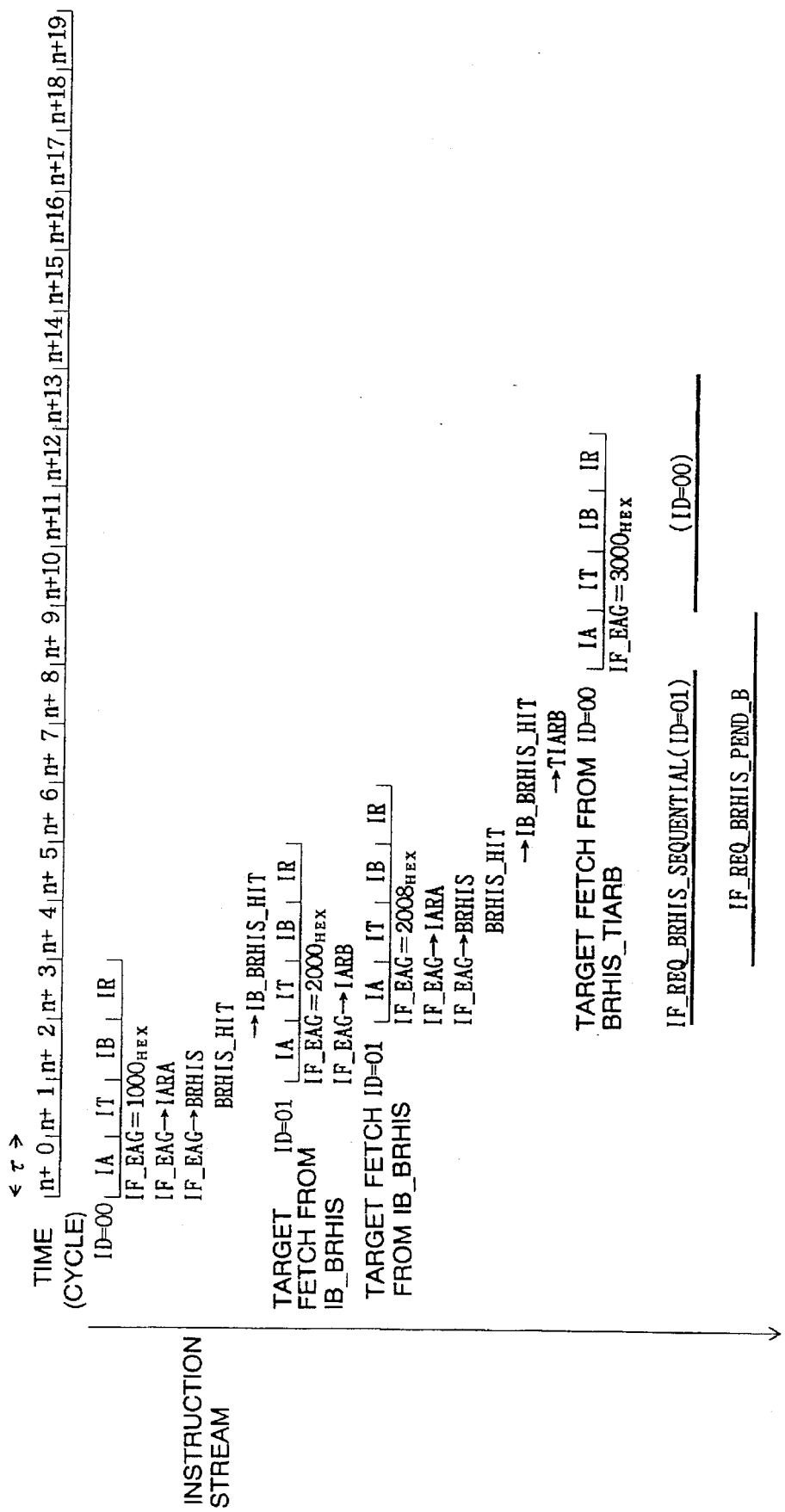
FIG. 9 is a schematic diagram for illustrating the operation of the instruction fetch pipeline of the instruction controlling system of FIG. 5.
Figure 10:
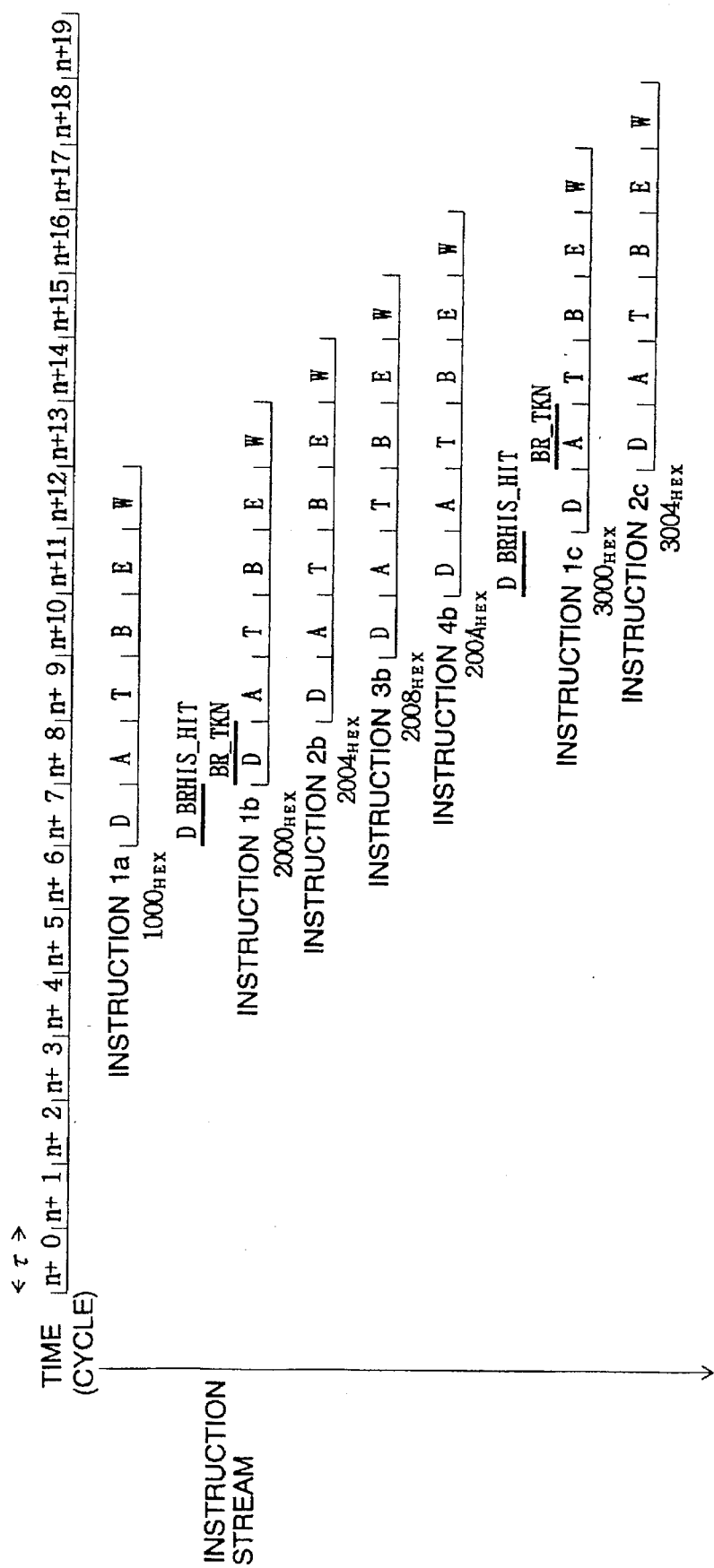
FIG. 10 is a schematic diagram for illustrating the operation of the instruction execution pipeline of the instruction controlling system of FIG. 5.
Figure 11:
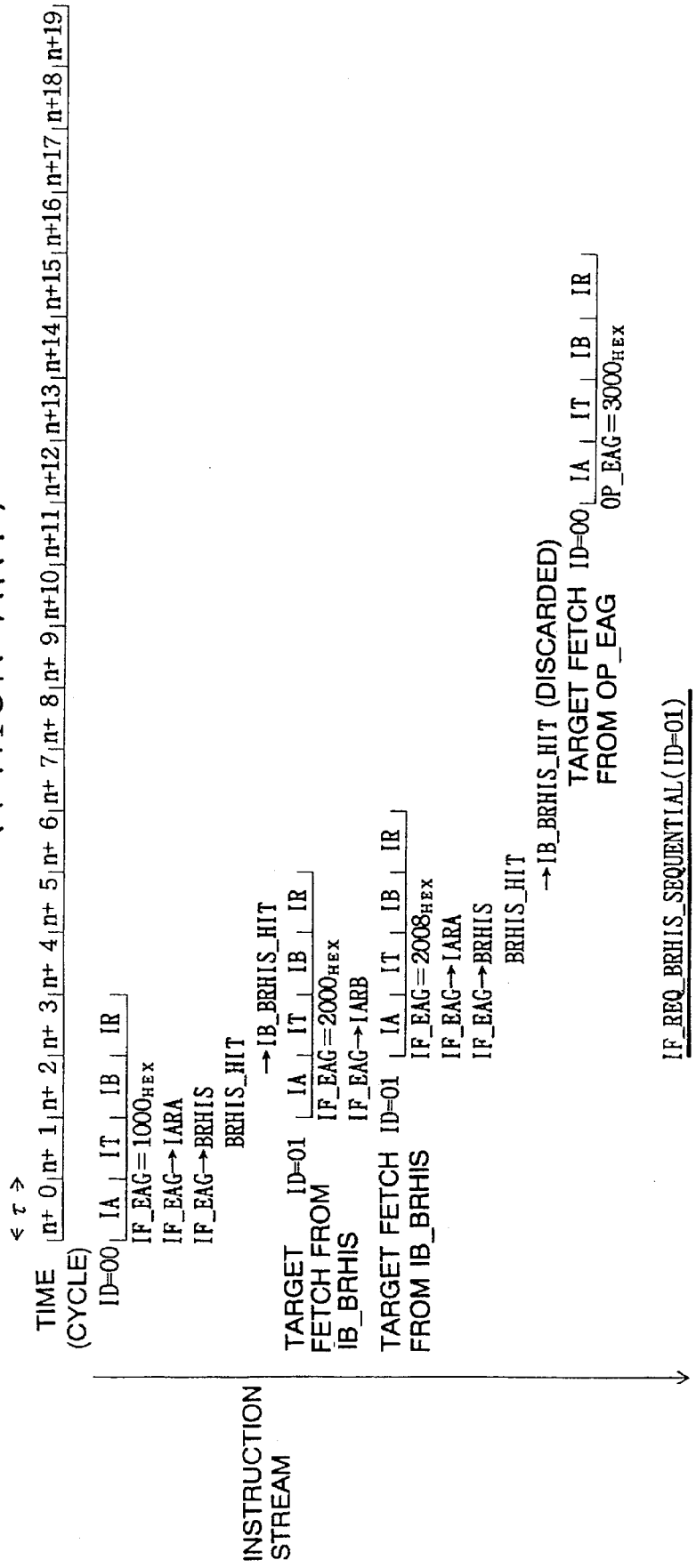
FIG. 11 is a schematic diagram for illustrating the operation of the instruction fetch pipeline of the conventional prior art system.
Figure 12:
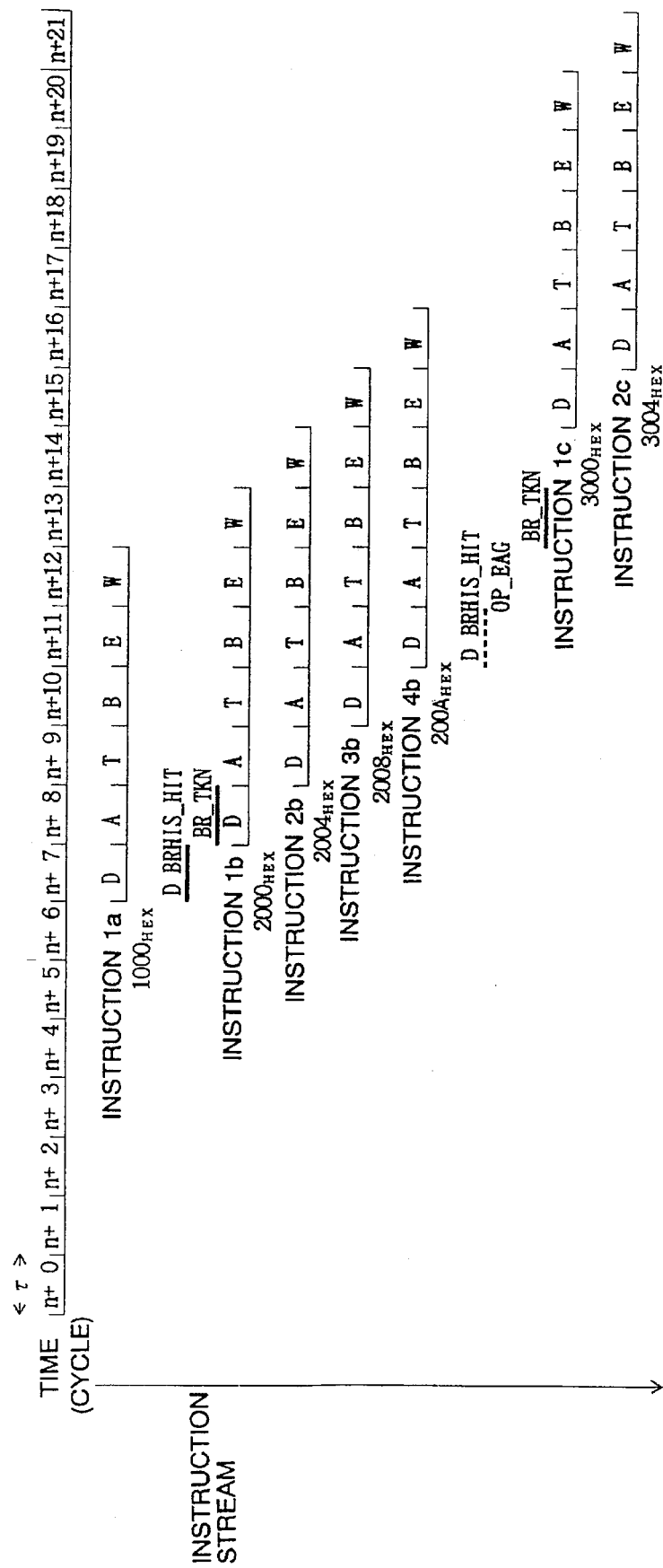
FIG. 12 is a schematic diagram for illustrating the operation of the instruction execution pipeline of the conventional prior art system.

An example of the operation effected when an instruction string shown in FIG. 8 is executed in the pipeline processor shown in FIG. 5 is shown in FIGS. 9 and 10, and an example of the operation effected when the same instruction string is executed in the conventional pipeline processor is shown in FIGS. 11 and 12.

Assume first that a branch instruction 1a whose branch destination is set at an address of $2000_{HEX}$ is set at an address $1000_{HEX}$ and a branch instruction 4b whose branch destination is set at an address of $3000_{HEX}$ is set at an address $2000_{HEX}$, as shown in FIG. 8.

In order to make the explanation simple, the explanation for the content of the operation of instructions other than the branch instruction is omitted. It is supposed that each instruction has an instruction length of 4 bytes and the execution thereof is completed in one flow process of the instruction execution pipeline EP. In FIGS. 9 to 12, the time interval between times indicated by integral numbers is T. Further, the C series is kept in the available state so as to permit the operand address generating circuit 60 to effect the instruction fetch when a branch instruction which does not hit the branch history is executed in the instruction execution pipeline EP.

At time (n+0), the A series is used with ID=00, the instruction fetch is started by setting an address (IF_EAG) generated from the address generating circuit 40 as IF_EAG=$1000_{HEX}$, and an instruction fetch request for the instruction of the address flows in the respective cycles IA, IT, IB and IR of the instruction fetch pipeline FP.

In either case of FIG. 9 or 11, the branch history is hit and branching-destination information is fetched when the branch history of the branch history storage section 48 is accessed by use of the address (IF_EAG), and the branching-destination information is used for instruction fetch in the IB cycle.

The instruction fetch based on the branching-destination information uses the B series with ID=01 and the first instruction fetch is started at time (n+2). When the first instruction fetch is started at time (n+2), the address is set into the address register 74B (IARB) of the address calculating section 70B of the address generating circuit 40, and fetch of a succeeding instruction string is effected at an address obtained by adding 8 to the address at time (n+3). The request for the succeeding instruction fetch is shown as a signal (IF_REQ_BRHIS_SEQUENTIAL) in FIGS. 9 and 11, and in this case, a signal (IF_REQ_BRHIS_SEQUENTIAL) for ID=01 is set.

In either case of FIG. 9 or 11, the branch history is hit in the second instruction fetch of ID=01 and a condition for instruction fetch based on the branch history is created in the IB cycle at time (n+5). However, as shown in FIGS. 10 and 12, at this time, the branch instruction at the address of $1000_{HEX}$ is not yet executed in the instruction execution pipeline and one of the instruction fetch series is exclusively used for branching-destination fetch by the branch history so that new fetch of the branching destination from the branch history will not be permitted at time (n+5).

Therefore, in the instruction fetch pipeline of the conventional system shown in FIG. 11, the address (IB_BRHIS_HIT) obtained from the branch history is discarded. However, in the instruction fetch pipeline FP of the system of the present invention shown in FIG. 9, an instruction fetch waiting tag (IF_REQ_BRHIS_PEND_B) is set and the branching-destination address (IB_BRHIS_TIAR) is held in the address register (TIARB) of the address holding section 80B of the branching-destination address holding circuit 42.

In either case of FIG. 9 or 11, a branch instruction of address $1000_{HEX}$ which first hits the branch history is determined at time (n+8) in the A cycle of the main pipeline, that is, instruction execution pipeline EP as shown in FIGS. 10 and 12, ID=01 is set as ID of the series now executed, and the signal (IF_REQ_BRHIS_SEQUENTIAL (ID=01)) for the succeeding instruction fetch is reset. At this time, the series A of instruction fetch becomes unnecessary and is released.

In this case, in the present invention, the following operation is effected by resetting the signal (IF_REQ_BRHIS_SEQUENTIAL) as shown in FIG. 9. That is, instruction fetch of the branching destination of the branch instruction at the address of $2004_{HEX}$ held so far is executed from time (n+9) by using the address of $3000_{HEX}$ on the address register (TIARB) and using the A series of ID=00 and the signal (IF_REQ_BRHIS_SEQUENTIAL) is set again as ID=00. At this time, the instruction fetch waiting tag (IF_REQ_BRHIS_PEND_B) is reset.

On the other hand, as shown in FIG. 11, in the conventional system, information of the branching destination of the branch instruction at the address of $2004_{HEX}$ is already discarded at the time when instruction fetch based on the branch history is not effected, that is, at time (n+5). Therefore, the branch instruction at the address of $2004_{HEX}$ is executed in the main pipeline and the branching is effected after an address of the branching destination is derived in the A cycle at time (n+12) in the operand address generating circuit 60.

Thus, in the pipeline processor according to the present invention, an instruction 1c at the address of $3000_{HEX}$ of the branching destination is executed following the branch instruction at the address of $200_{HEX}$, but in the conventional pipeline processor, application of the instruction 1c at the address of $3000_{HEX}$ to the instruction execution pipeline is delayed by time required for instruction fetch of the branching destination and time delay of 3T occurs.

Thus, even in a case where a branch instruction is present in an instruction string read out prior to instruction execution and whether the branch is taken or not can be determined only after the instruction execution, a branching-destination address is held and an instruction stored in the branching-destination address is fetched and stored immediately after it becomes possible to fetch the instruction. Therefore, the instruction stored in the branching-destination address can be applied to the instruction execution pipeline without delay when it is determined that the branching of the branch instruction is taken, thus making it possible to efficiently effect the process of the pipeline processor even if the frequency of occurrence of the branch instruction is high.

It is apparent that, in this invention, a wide range of different working modes can be formed based on the invention without deviating from the spirit and scope of the invention.

What is claimed is:

1. An instruction controlling method in a pipeline processor for storing the history of information on the result of past execution of branch instructions, addresses in which the branch instructions are stored, and branching-destination addresses of the branch instructions when the branch is taken as branch history into a branch history storing section and processing the instruction fetch in a pipeline fashion prior to the instruction execution based on the content of said branch history, comprising:

an address generating step of generating either addresses which start from a preset address and are incremented by a preset amount from an address of an instruction fetched in an immediately preceding cycle or an address obtained by execution of a branch instruction;

a branch history retrieving step of referring to said branch history and fetching branch-possibility information indicating the possibility of the branch based on the history of the branching result of the branch instruction and a branching-destination address corresponding to the branch-possibility information from said branch history when an instruction corresponding to the address generated in said address generating step is a branch instruction registered in said branch history;

an address holding step of holding the branching-destination address when the branch-possibility information and branching-destination address are fetched in said branch history retrieving step;

a first instruction fetch step of fetching an instruction corresponding to the address generated in said address generating step; and a second instruction fetch step of fetching an instruction of an address held in said address holding step immediately after it becomes possible to fetch the instruction and then returning the process to said address generating step in a case where the instruction fetched in said first instruction fetch step has the branch-possibility information and branching-destination address provided in said branch history retrieving step, and returning the process to said address generating step without fetching any instruction in a case where the instruction fetched in said first instruction fetch step does not have the branch-possibility information and branching-destination address provided in said branch history retrieving step.

2. A method according to claim 1, wherein said branch history retrieving step includes:

a history referring step of referring to said branch history by using an address generated in said address generating step as a key;

an instruction determining step of determining whether an instruction corresponding to the address is a branch instruction registered in said branch history or not based on the result of reference to said branch history and causing said first instruction fetch step to be effected when the instruction is not a branch instruction registered in said branch history; and information extracting step of fetching branch-possibility information indicating the possibility of the branch derived from the history of the branching result of the branch instruction and a branching-destination address corresponding to the branch-possibility information from said branch history when the instruction corresponding to the address is registered in said branch history and then causing said address holding step to be effected.

3. A method according to claim 1, wherein said second instruction fetch step includes:

a hit determining step of determining whether or not an instruction fetched in said first instruction fetch step has the branch-possibility information and branching-destination address provided in said branch history retrieving step and returning the process to said address generating step when the result of determination is "NO";

a fetch determining step of determining whether an instruction of an address held in said address holding step can be fetched or not and holding the address until it becomes possible to fetch the instruction; and a prefetch step of fetching an instruction by use of a corresponding address when it is determined in said fetch determining step that the instruction can be fetched and then returning the process to said address generating step.

4. An instruction controlling method in a pipeline processor for storing the history of information on the result of past execution of branch instructions, addresses in which the branch instructions are stored, and branching-destination addresses of the branch instructions when the branch is taken as branch history into a branch history storing section and processing the instruction fetch in a pipeline fashion prior to the instruction execution based on the content of said branch history, comprising:

an address generating step of generating addresses of a plurality of series selectively used and corresponding to either addresses which start from a preset address and are incremented by a preset amount from an address of an instruction fetched in an immediately preceding cycle or an address obtained by execution of a branch instruction;

a branch history retrieving step of referring to said branch history and fetching branch-possibility information indicating the possibility of the branch derived from the history of the branching result of the branch instruction and a branching-destination address corresponding to the branch-possibility information from said branch history when an instruction corresponding to the address generated in said address generating step is a branch instruction registered in said branch history;

an address holding step of holding the branching-destination address for each of said series of addresses generated in said address generating step when the branch-possibility information and branching-destination address are fetched in said branch history retrieving step;

a first instruction fetch step of fetching an instruction corresponding to the address generated in said address generating step;

a second instruction fetch step of fetching an instruction of an address held in said address holding step immediately after it has becomes possible to fetch the instruction in a case where the instruction fetched in said first instruction fetch step has the branch-possibility information and branching-destination address provided in said branch history retrieving step, and returning the process to said address generating step without fetching any instruction in a case where the instruction fetched in said first instruction fetch step does not have the branch-possibility information and branching-destination address provided in said branch history retrieving step and if the instruction is not a branch instruction; and a series switching step of switching an address series and returning the process to said address generating step after an instruction has been fetched in said second instruction fetch step, and after execution of a branch instruction in a case where the instruction fetched in said first instruction fetch step does not obtain the branch-possibility information and branching-destination address provided in said branch history retrieving step and the instruction is a branch instruction.

5. A method according to claim 4, wherein said branch history retrieving step includes:

a history referring step of referring to said branch history by using an address generated in said address generating step as a key;

an instruction determining step of determining whether an instruction corresponding to the address is a branch instruction registered in said branch history or not based on the result of reference to said branch history and causing said first instruction fetch step to be effected when the instruction is not a branch instruction registered in said branch history; and information extracting step of fetching branch-possibility information indicating the possibility of the branch derived from the history of the branching result of the branch instruction and a branching-destination address corresponding to the branch-possibility information from said branch history when the instruction corresponding to the address is registered in said branch history and then causing said address holding step to be effected.

6. A method according to claim 4, wherein said second instruction fetch step includes:

a hit determining step of determining whether or not an instruction fetched in said first instruction fetch step has the branch-possibility information and branching-destination address provided in said branch history retrieving step;

a branch determining step of determining whether the instruction is a branch instruction or not when the result of determination in said hit determining step is "NO", returning the process to said address generating step when the instruction is not a branch instruction, and causing said series switching step to be effected when the instruction is a branch instruction;

a fetch determining step of determining whether an instruction of an address held in said address holding step can be fetched or not and holding the address until it becomes possible to fetch the instruction; and a prefetch step of fetching an instruction by use of a corresponding address when it is determined in said fetch determining step that the instruction can be fetched and then causing said series switching step to be effected.

7. An instruction controlling apparatus in a pipeline processor comprising:

branch history storing means for storing branch history constructed by the history of information on the result of past execution of branch instructions, addresses in which the branch instructions are stored, and branching-destination addresses of the branch instructions when the branch is taken;

address generating means for generating either addresses which start from a preset address and are incremented by a preset amount from an address of an instruction fetched in an immediately preceding cycle or an address obtained by execution of a branch instruction;

branch history retrieving means for referring to said branch history and fetching branch-possibility information indicating the possibility of the branch derived from the history of the branching result of the branch instruction and a branching-destination address corresponding to the branch-possibility information from said branch history when an instruction corresponding to the address generated in said address generating means is a branch instruction registered in said branch history;

prefetch address holding means for holding the branching-destination address when the branch-possibility information and branching-destination address are fetched in said branch history retrieving means; and instruction fetch means for fetching an instruction of an address held in said prefetch address holding means when an instruction fetched in the immediately preceding cycle has the branch-possibility information and branching-destination address provided in said branch history retrieving means, fetching an instruction of an address generated from said address generating means when an instruction fetched in the immediately preceding cycle does not have the branch-possibility information and branching-destination address provided in said branch history retrieving means to use the fetched instruction for execution, and fetching an instruction when it becomes possible to effect instruction fetch in a case where fetch of the instruction based on the address held in said prefetch address holding means is effected.

8. An apparatus according to claim 7, wherein said branch history retrieving means includes:

means for referring to said branch history by using an address generated from said address generating means as a key and determining whether an instruction corresponding to the address is a branch instruction registered in said branch history or not;

means for causing said instruction fetch means to fetch an instruction when the instruction corresponding to the address is not a branch instruction registered in said branch history; and means for fetching branch-possibility information indicating the possibility of the branch derived from the history of the branching result of the branch instruction and a branching-destination address corresponding to the branch-possibility information from said branch history and causing the same to be held in said prefetch address holding means in a case where the instruction corresponding to the address is registered in said branch history.

9. An apparatus according to claim 7, wherein said instruction fetch means includes:

means for determining whether or not an instruction fetched in an immediately preceding cycle has the branch-possibility information and branching-destination address provided in said branch history retrieving means;

means for determining whether an instruction of an address held in said address holding means can be fetched or not when it is determined that an instruction fetched in the immediately preceding cycle has the branch-possibility information and branching-destination address provided in said branch history retrieving means; and means for fetching an instruction by use of an address when it is determined that an instruction of the address held in said address holding means can be fetched.

10. An instruction controlling apparatus in a pipeline processor comprising:

branch history storing means for storing branch history constructed by the history of information on the result of past execution of branch instructions, addresses in which the branch instructions are stored, and branching-destination addresses of the branch instructions when the branch is taken;

a plurality of series of address generating means for generating either addresses which start from a preset address and are incremented by a preset amount from an address of an instruction fetched in an immediately preceding cycle or an address obtained by execution of a branch instruction;

branch history retrieving means for referring to said branch history and fetching branch-possibility information indicating the possibility of the branch derived from the history of the branching result of the branch instruction and a branching-destination address corresponding to the branch-possibility information from said branch history when an instruction corresponding to the address generated from said address generating means is a branch instruction registered in said branch history;

a plurality of series of prefetch address holding means corresponding to said plurality of series of address generating means, for holding the branching-destination address for each of the address series of said plurality of series of address generating means when the branch-possibility information and branching-destination address are fetched in said branch history retrieving means;

instruction fetch means for fetching an instruction of an address held in said prefetch address holding means when an instruction fetched in the immediately preceding cycle has the branch-possibility information and branching-destination address provided in said branch history retrieving means, fetching an instruction of an address generated from said address generating means when an instruction fetched in the immediately preceding cycle does not have the branch-possibility information and branching-destination address provided in said branch history retrieving means to use the fetched instruction for execution, and fetching an instruction when it becomes possible to effect instruction fetch in a case where fetch of the instruction based on the address held in said prefetch address holding means is effected;

series switching means for switching the series of said address generating means and said prefetch address holding means after an instruction based on the address held in said prefetch address holding means has been fetched in said instruction fetch means, and after execution of a branch instruction in a case where the instruction fetched in the immediately preceding cycle in said instruction fetch means does not obtain the branch-possibility information and branching-destination address provided in said branch history retrieving means and the instruction is a branch instruction.

11. An apparatus according to claim 10, wherein said branch history retrieving means includes:

means for referring to said branch history by using an address generated from said address generating means as a key and determining whether an instruction corresponding to the address is a branch instruction registered in said branch history or not;

means for causing said instruction fetch means to fetch an instruction when the instruction corresponding to the address is not a branch instruction registered in said branch history;

means for fetching branch-possibility information indicating the possibility of the branch derived from the history of the branching result of the branch instruction and a branching-destination address corresponding to the branch-possibility information from said branch history when the instruction corresponding to the address is registered in said branch history and causing the same to be held in said prefetch address holding means of a series corresponding to said address generating means.

12. An apparatus according to claim 10, wherein said instruction fetch means includes:

means for determining whether or not an instruction fetched in an immediately preceding cycle obtains the branch-possibility information and branching-destination address provided in said branch history retrieving means;

means for determining whether the instruction is a branch instruction or not when it is determined that the instruction fetched in the immediately preceding cycle obtains the branch-possibility information and branching-destination address provided in said branch history retrieving means;

means for operating said series switching means when the instruction fetched in the immediately preceding cycle does not obtain the branch-possibility information and branching-destination address provided in said branch history retrieving means and the instruction is a branch instruction;

means for determining whether an instruction of an address held in said address holding means can be fetched or not when it is determined that the instruction fetched in the immediately preceding cycle has the branch-possibility information and branching-destination address provided in said branch history retrieving means;

means for fetching an instruction by use of the address when it is determined that the instruction of the address held in said address holding means can be fetched.

13. A pipeline processor comprising:

an instruction fetch pipeline for sequentially fetching instructions, said instruction fetch pipeline including:

a branch history storing section for storing branch history constructed by the history of information on the result of past execution of branch instructions, addresses in which the branch instructions are stored, and branching-destination addresses of the branch instructions when the branch is taken, an address generating section for generating either addresses which start from a preset address and are incremented by a preset amount from an address of an instruction fetched in an immediately preceding cycle or an address obtained by execution of a branch instruction;

a branch history retrieving section for referring to said branch history and fetching branch-possibility information indicating the possibility of the branch derived from the history of the branching result of the branch instruction and a branching-destination address corresponding to the branch-possibility information from said branch history when an instruction corresponding to the address generated from said address generating section is a branch instruction registered in said branch history;

a prefetch address holding section for holding the branching-destination address when the branch-possibility information and branching-destination address are fetched in said branch history retrieving section;

an instruction buffer section for temporarily storing a fetched instruction; and an instruction fetch section for fetching an instruction of an address held in said prefetch address holding section when an instruction fetched in the immediately preceding cycle has the branch-possibility information and branching-destination address provided in said branch history retrieving section, fetching an instruction of an address generated from said address generating section when an instruction fetched in the immediately preceding cycle does not have the branch-possibility information and branching-destination address provided in said branch history retrieving section to use the fetched instruction for execution, and fetching an instruction when it becomes possible for said instruction buffer to store an instruction in a case where fetch of the instruction based on the address held in said prefetch address holding means is effected; and instruction execution pipeline means for sequentially executing instructions stored in said instruction buffer.

14. A pipeline processor comprising:

an instruction fetch pipeline for sequentially fetching instructions, said instruction fetch pipeline including:

a branch history storing section for storing branch history constructed by the history of information on the result of past execution of branch instructions, addresses in which the branch instructions are stored, and branching-destination addresses of the branch instructions when the branch is taken, a plurality of series of address generating sections for generating either addresses which start from a preset address and are incremented by a preset amount from an address of an instruction fetched in an immediately preceding cycle or an address obtained by execution of a branch instruction;

a branch history retrieving section corresponding to said plurality of series of address generating sections, for referring to said branch history and fetching branch-possibility information indicating the possibility of the branch derived from the history of the branching result of the branch instruction and a branching-destination address corresponding to the branch-possibility information from said branch history when an instruction corresponding to the address generated from said address generating section is a branch instruction registered in said branch history;

a plurality of series of prefetch address holding sections corresponding to said plurality of series of address generating sections, for holding the branching-destination address for each of the address series of said plurality of series of address generating sections when the branch-possibility information and branching-destination address are fetched in said branch history retrieving section;

an instruction buffer section for temporarily storing a fetched instruction; and an instruction fetch section for fetching an instruction of an address held in said prefetch address holding section when an instruction fetched in the immediately preceding cycle has the branch-possibility information and branching-destination address provided in said branch history retrieving section, fetching an instruction of an address generated from said address generating section when an instruction fetched in the immediately preceding cycle does not have the branch-possibility information and branching-destination address provided in said branch history retrieving section to use the fetched instruction for execution, and fetching an instruction when it becomes possible for said instruction buffer to store an instruction in a case where fetch of the instruction based on the address held in said prefetch address holding section is effected, and a series switching section for switching the series of said address generating section and said prefetch address holding section after an instruction based on the address held in said prefetch address holding section has been fetched in said instruction fetch section, and after execution of a branch instruction in a case where the instruction fetched in the immediately preceding cycle in said instruction fetch section does not have the branch-possibility information and branching-destination address provided in said branch history retrieving section and the instruction is a branch instruction; and instruction execution pipeline means for sequentially executing instructions stored in said instruction buffer.

* * * * *